(12) United States Patent
Lee et al.

(10) Patent No.: US 11,436,176 B2
(45) Date of Patent: Sep. 6, 2022

(54) SEMICONDUCTOR INTEGRATED CIRCUIT AND OPERATION METHOD THEREOF

(71) Applicant: SAMSUNG ELECTRONICS CO., LTD., Suwon-si (KR)

(72) Inventors: Kyungsoo Lee, Yongin-si (KR); Jaewon Lee, Seongnam-si (KR); Junho Huh, Yongin-si (KR); Helin Lin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/734,844

(22) Filed: Jan. 6, 2020

(65) Prior Publication Data

US 2020/0242066 A1  Jul. 30, 2020

(30) Foreign Application Priority Data

Jan. 25, 2019 (KR) .......................... 10-2019-0009830

(51) Int. Cl.
*G06F 13/40* (2006.01)
*G06F 9/4401* (2018.01)
*G06F 13/24* (2006.01)
*G06F 13/42* (2006.01)

(52) U.S. Cl.
CPC ........ *G06F 13/4068* (2013.01); *G06F 9/4418* (2013.01); *G06F 13/24* (2013.01); *G06F 13/4291* (2013.01)

(58) Field of Classification Search
CPC .... G06F 9/4418; G06F 13/24; G06F 13/4068; G06F 13/4291
See application file for complete search history.

(56) References Cited

U.S. PATENT DOCUMENTS

| | | | |
|---|---|---|---|
| 9,092,393 | B2 | 7/2015 | Whitefield et al. |
| 9,563,398 | B2 | 2/2017 | Mishra et al. |
| 9,934,171 | B2 | 4/2018 | Mishra et al. |
| 10,140,242 | B2 | 11/2018 | Mishra et al. |
| 2002/0142785 | A1* | 10/2002 | Park ...................... H04W 68/00 455/458 |
| 2017/0039162 | A1 | 2/2017 | Mishra et al. |
| 2017/0075852 | A1* | 3/2017 | Mishra ................ G06F 13/4282 |
| 2017/0168966 | A1 | 6/2017 | Mishra et al. |
| 2018/0232324 | A1 | 8/2018 | Mishra et al. |
| 2019/0236037 | A1* | 8/2019 | Sugumar ................. G06F 1/266 |
| 2020/0081836 | A1* | 3/2020 | Kaushikkar ......... G06F 12/0855 |

* cited by examiner

*Primary Examiner* — Nimesh G Patel
(74) *Attorney, Agent, or Firm* — Volentine, Whitt & Francos, PLLC

(57) ABSTRACT

A semiconductor integrated circuit includes a central processing unit, a hardware function block that outputs a plurality of hardware signals to be transmitted to an external device independently of the central processing unit, a virtual general purpose input/output (GPIO) finite state machine that transforms the plurality of hardware signals to a virtual GPIO payload, and an I3C communication block that transmits the virtual GPIO payload to the external device through a serial data line and a serial clock line.

13 Claims, 19 Drawing Sheets

SEMICONDUCTOR INTEGRATED CIRCUIT AND OPERATION METHOD THEREOF

CROSS-REFERENCE TO RELATED APPLICATIONS

This application claims priority under 35 U.S.C. § 119 to Korean Patent Application No. 10-2019-0009830 filed on Jan. 25, 2019, in the Korean Intellectual Property Office, the disclosure of which is incorporated by reference herein in its entirety.

TECHNICAL FIELD

Embodiments of the disclosure described herein relate to an electronic device, and more particularly, relate to a semiconductor integrated circuit and an operation method thereof.

BACKGROUND

As semiconductor technologies develop, a semiconductor integrated circuit may include a plurality of function blocks or devices configured to perform various functions. The function blocks or devices of the semiconductor integrated circuit may be configured to communicate with each other through various manners.

For example, the function blocks or the devices of the semiconductor integrated circuit may communicate with each other through general purpose input/output (GPIO) ports. However, as the size of the semiconductor integrated circuit decreases, nowadays, the complexity of routing for a plurality of GPIO ports is increasing.

SUMMARY

Embodiments of the disclosure provide a semiconductor integrated circuit having reduced costs and improved performance and an operation method thereof.

According to an example embodiment, a semiconductor integrated circuit includes a central processing unit, a hardware function block that outputs a plurality of hardware signals to be transmitted to an external device independently of the central processing unit, a virtual general purpose input/output (GPIO) finite state machine that transforms the plurality of hardware signals to a virtual GPIO payload, and an I3C communication block that transmits the virtual GPIO payload to the external device through a serial data line and a serial clock line.

According to an example embodiment, a semiconductor integrated circuit includes a central processing unit, a hardware function block that outputs a plurality of first hardware signals based on a general purpose input/output (GPIO) independently of the central processing unit, a virtual GPIO finite state machine that generates a first virtual GPIO payload based on masking information set by the central processing unit and the plurality of first hardware signals, an I3C communication block that transmits the first virtual GPIO payload to an external device through a serial data line and a serial clock line, and a management block that provides a main clock or a first clock to the central processing unit, the hardware function block, the virtual GPIO finite state machine, and the I3C communication block. In a sleep mode, the management block blocks the main clock and provides the first clock to the I3C communication block and the virtual GPIO finite state machine in response to a pulled-down low level of the serial data line. In the sleep mode, the I3C communication block and the virtual GPIO finite state machine wake up in response to the first clock, the I3C communication block that wakes up receives a second virtual GPIO payload from the external device through the serial data line and the serial clock line, based on an in-band-interrupt manner, and the virtual GPIO finite state machine that wakes up transforms the second virtual GPIO payload to a plurality of second hardware signals.

According to an example embodiment, an operation method of a semiconductor integrated circuit which is configured to communicate with an external device through an I3C bus including a serial data line and a serial clock line includes generating a plurality of hardware signals based on a general purpose input/output (GPIO), generating a first virtual GPIO payload based on masking information set by a central processing unit and the plurality of first hardware signals, and transmitting the first virtual GPIO payload to an external device through the serial data line and the serial clock line, without intervention of the central processing unit.

According to an example embodiment, an electronic device includes a first circuit, a protocol converter circuit, and a communication interface circuit. The first circuit generates first general purpose input/output (GPIO) signals including first information to be provided into a second circuit in a first external electronic device. The protocol convertor circuit receives the first GPIO signals from the first circuit, and represents the first information with first data. The communication interface circuit communicates the first data to the corresponding electronic device through a I3C serial communication bus.

BRIEF DESCRIPTION OF THE FIGURES

The above and other objects and features of the disclosure will become apparent by describing in detail example embodiments thereof with reference to the accompanying drawings.

DETAILED DESCRIPTION

Below, embodiments of the disclosure may be described in detail and clearly to such an extent that an ordinary one in the art easily implements the disclosure.

In the following description, components corresponding to terms such as "block", "unit", "machine", "logic", "buffer", etc. may be implemented in the form of software, hardware, or a combination thereof.

Figure 1A:
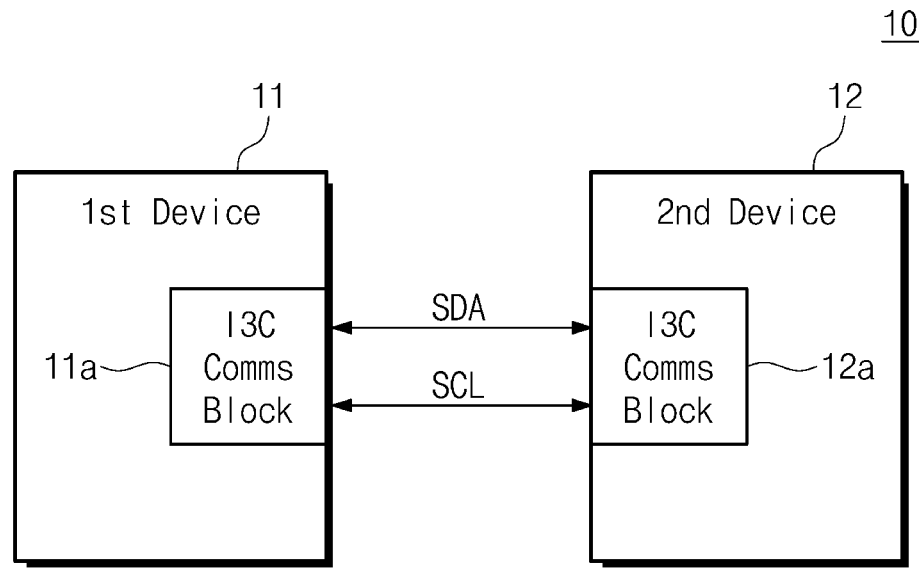
FIGS. 1A and 1B are block diagrams illustrating an electronic device.
Figure 1B:
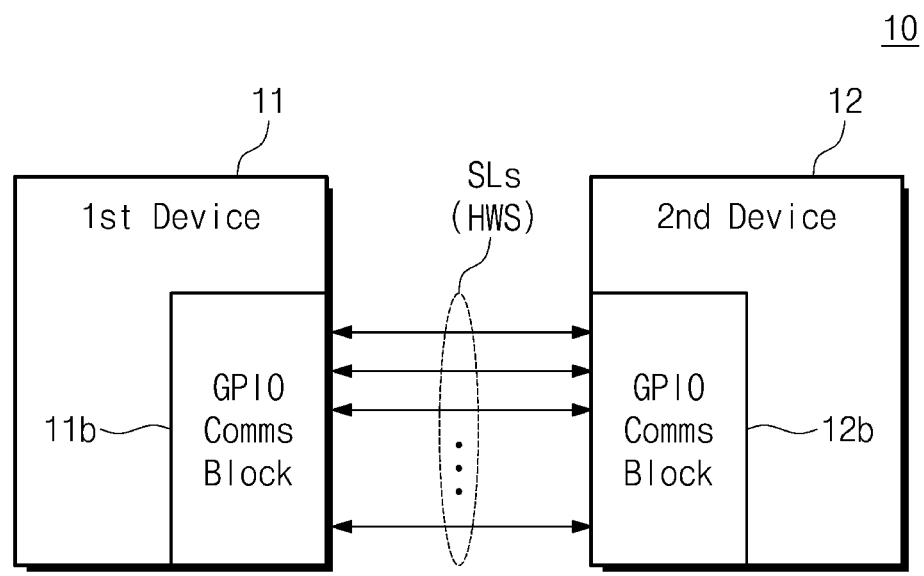

FIGS. 1A and 1B are block diagrams illustrating an electronic device. Referring to FIGS. 1A and 1B, an electronic device 10 may include a first device 11 and a second device 12. Each of the first device 11 and the second device 12 may include a hardware function block configured to perform a specific function or may be a semiconductor device or a semiconductor integrated circuit configured to perform the specific function. In an example embodiment, the first device 11 may be a system on chip (SoC) such as an application processor (AP), and the second device 12 may be an electronic device, which is configured to perform various functions, such as an accelerometer, a light sensor, a proximity sensor, an illumination sensor, a fingerprint sensor, a display device, a camera device, or a communication device.

The first device 11 and the second device 12 may be configured to communicate with each other based on a specific interface or a specific protocol. For example, as illustrated in FIG. 1A, the first and second devices 11 and 12 may include I3C communication blocks 11a and 12a, respectively. The I3C communication blocks 11a and 12a may perform serial communication mutually in compliance with the I3C interface protocol defined by the MIPI (Mobile Industry Processor Interface) alliance. That is, the first device 11 may exchange data or information with the second device 12 through a serial data line SDA and a serial clock line SCL connected through the I3C communication block 11a.

Alternatively, as illustrated in FIG. 1B, the first and second devices 11 and 12 may include GPIO (General-Purpose Input/Output) communication blocks 11b and 12b, respectively. The GPIO communication blocks 11b and 12b may exchange hardware signals HWS through a plurality of signal lines SLs (e.g., physical signal lines). The hardware signals HWS may indicate information that is exchanged between hardware function blocks included in the first and second devices 11 and 12. As described above, the first and second devices 11 and 12 may communicate with each other in compliance with a predefined communication manner (e.g., an I3C or GPIO communication manner).

In an example embodiment, the communication manner using I3C communication blocks (e.g., 11a and 12a) may make it possible for devices to communicate by using a relatively small number of signal lines or signal pins (e.g., two signal lines in the case of the I3C) but may require intervention of a separate central processing unit (CPU) or separate software. In contrast, the communication manner using GPIO communication blocks (e.g., 11b and 12b) may make it possible for devices to communicate without intervention of a separate CPU or separate software but may cause an increase in the number of signal lines or signal pins necessary for communication.

Figure 2:
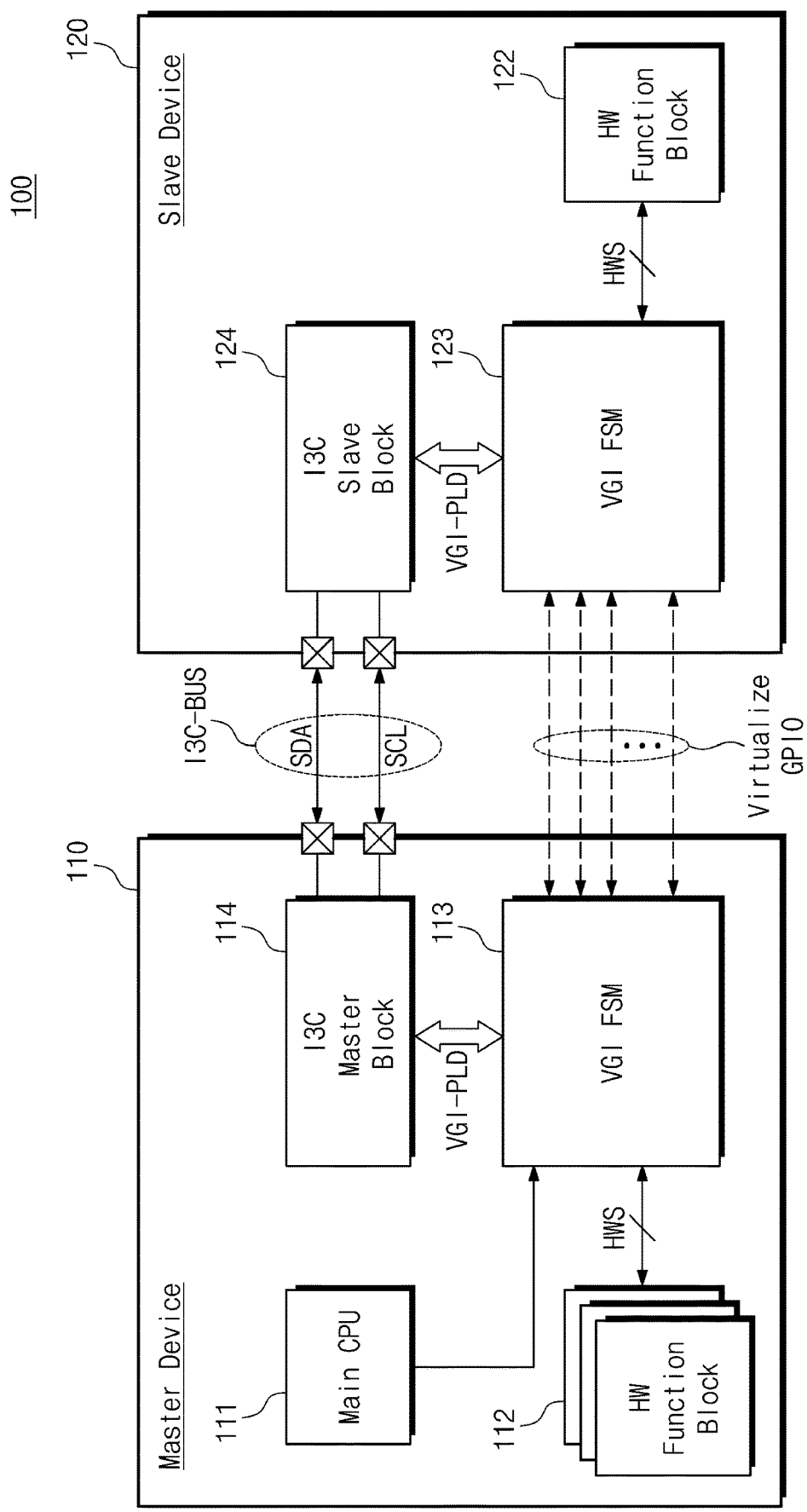
FIG. 2 is a block diagram illustrating an electronic device according to an embodiment of the disclosure.

FIG. 2 is a block diagram illustrating an electronic device according to an embodiment of the disclosure. Referring to FIG. 2, an electronic device 100 may include a master device 110 and a slave device 120. The master device 110 may be a system on chip (SoC) such as an application processor configured to control overall operations of a user device (e.g., a mobile device, a smartphone, a personal computer (PC), or an electronic system of a vehicle) that includes the electronic device 100. The slave device 120 may be an electronic device, which is configured to perform a specific function, such as an accelerometer, a light sensor, a proximity sensor, an illumination sensor, a fingerprint sensor, a display device, a camera device, or a communication device.

Below, to describe a technical feature of the disclosure easily, embodiments of the disclosure will be described with reference to components of the master device 110. However, the disclosure is not limited thereto. For example, operations of components included in the slave device 120 may be similar to operations of the components included in the master device 110.

Below, to describe a technical feature of the disclosure easily, a description will be given under the assumption that communication between the master device 110 and the slave device 120 is performed in compliance with the I3C protocol defined by the MIPI alliance. However, the disclosure is not limited thereto. For example, the master device 110 and the slave device 120 may exchange virtual hardware signals (i.e., virtual GPIO payload or any other virtualization information) in compliance with various communication protocols such as I3C, I2C, UART (Universal Asynchronous Receiver/Transmitter), and SPMI (System Power Management Interface).

The master device 110 may include a main central processing unit (CPU) 111, a hardware function block 112, a virtual GPIO finite state machine (FSM) 113, and an I3C master block 114.

The main CPU 111 may control overall operations of the master device 110 and may execute various applications on the master device 110. The main CPU 111 may be configured to mask specific information to the virtual GPIO finite state machine 113. For example, the main CPU 111 may set masking information indicating a kind of signals that are used or defined by the hardware function block 112. In an example embodiment, the masking information may be set in an initial operation of the master device 110 or may be set or changed while the master device 110 is driven. In an example embodiment, the masking information may include information about each of a plurality of slave devices.

The hardware function block 112 may be a hardware device configured to perform a specific function. For example, the hardware function block 112 may be an intellectual property (IP) block indicating a reusable function block that is pre-configured to perform a specific function. That is, the hardware function block 112 may indicate a hardware component, such as a processing unit, a static random-access memory (SRAM), a read only memory (ROM), or a microcontroller, which is configured to perform a specific function. In an example embodiment, the hardware function block 112 may operate independently of the main CPU 111.

Below, for convenience of description and brevity of illustration, it is assumed that each of the master device 110 and the slave device 120 includes one hardware function block. However, the disclosure is not limited thereto. For example, the master device 110 may include one or more hardware function blocks and the one or more hardware function blocks may be configured to perform different specific functions or to communicate with different slave devices.

The virtual GPIO finite state machine (hereinafter referred to as "VGI FSM") 113 may be configured to virtualize the hardware signals HWS corresponding to the hardware function block 112 to generate a virtual GPIO payload VGI-PLD or may be configured to transform the virtual GPIO payload VGI-PLD to the hardware signals HWS. For example, the hardware function block 112 may be configured to communicate with a hardware function block 122 of the slave device 120 based on a GPIO communication manner That is, the hardware function block 112 may output a plurality of hardware signals HWS for communicating with the hardware function block 122 of the slave device 120. Here, the plurality of hardware signals HWS may be signals based on the GPIO. The plurality of hardware signals HWS may be provided to the VGI FSM 113. The VGI FSM 113 may virtualize the plurality of hardware signals HWS provided from the hardware function block 112 to generate the virtual GPIO payload VGI-PLD. The generated virtual GPIO payload VGI-PLD may be provided to the I3C master block 114.

The I3C master block 114 may transmit the virtual GPIO payload VGI-PLD generated from the VGI FSM 113 to the slave device 120 through an I3C bus (e.g., a serial data line SDA and a serial clock line SCL).

The slave device 120 may include an I3C slave block 124, a virtual GPIO FSM 123, and a hardware function block 122. The I3C slave block 124 may receive the virtual GPIO payload VGI-PLD through the I3C bus (e.g., SDA and SCL) and may transfer the received virtual GPIO payload VGI-PLD to the virtual GPIO FSM 123. The virtual GPIO FSM 123 may transform the virtual GPIO payload VGI-PLD to the hardware signals HWS recognizable by the hardware function block 122 and may transfer the transformed hardware signals HWS to the hardware function block 122.

As described above, according to an embodiment of the disclosure, in the communication between the hardware function block 112 of the master device 110 and the hardware function block 122 of the slave device 120, the virtual GPIO payload VGI-PLD may be generated through virtualization of the hardware signals HWS and may be exchanged through the I3C bus (e.g., SDA and SCL). In this case, the hardware function blocks 112 and 122 may exchange data, signals, or information based on the GPIO through the I3C bus I3C-BUS, without intervention of the main CPU 111 or separate software.

For example, to exchange the plurality of hardware signals HWS, the hardware function blocks 11 and 12 require the plurality of signal lines SLs (i.e., physical signal lines) as illustrated in FIG. 1B. In contrast, as illustrated in FIG. 2, physical signal lines for exchanging hardware signals may be virtualized by generating the virtual GPIO payload VGI-PLD through the virtualization of the plurality of hardware signals HWS provided from the hardware function block 112/122 and transmitting and receiving the generated virtual GPIO payload VGI-PLD through the I3C bus (e.g., SDA and SCL) (i.e., a GPIO interface is virtualized). Accordingly, the hardware signals HWS may be transmitted/received between the hardware function blocks 112 and 122 through the I3C bus (including SDA and SCL), without intervention of the main CPU 111 or separate software. Accordingly, a semiconductor integrated circuit having reduced costs and improved performance is provided.

Figure 3:
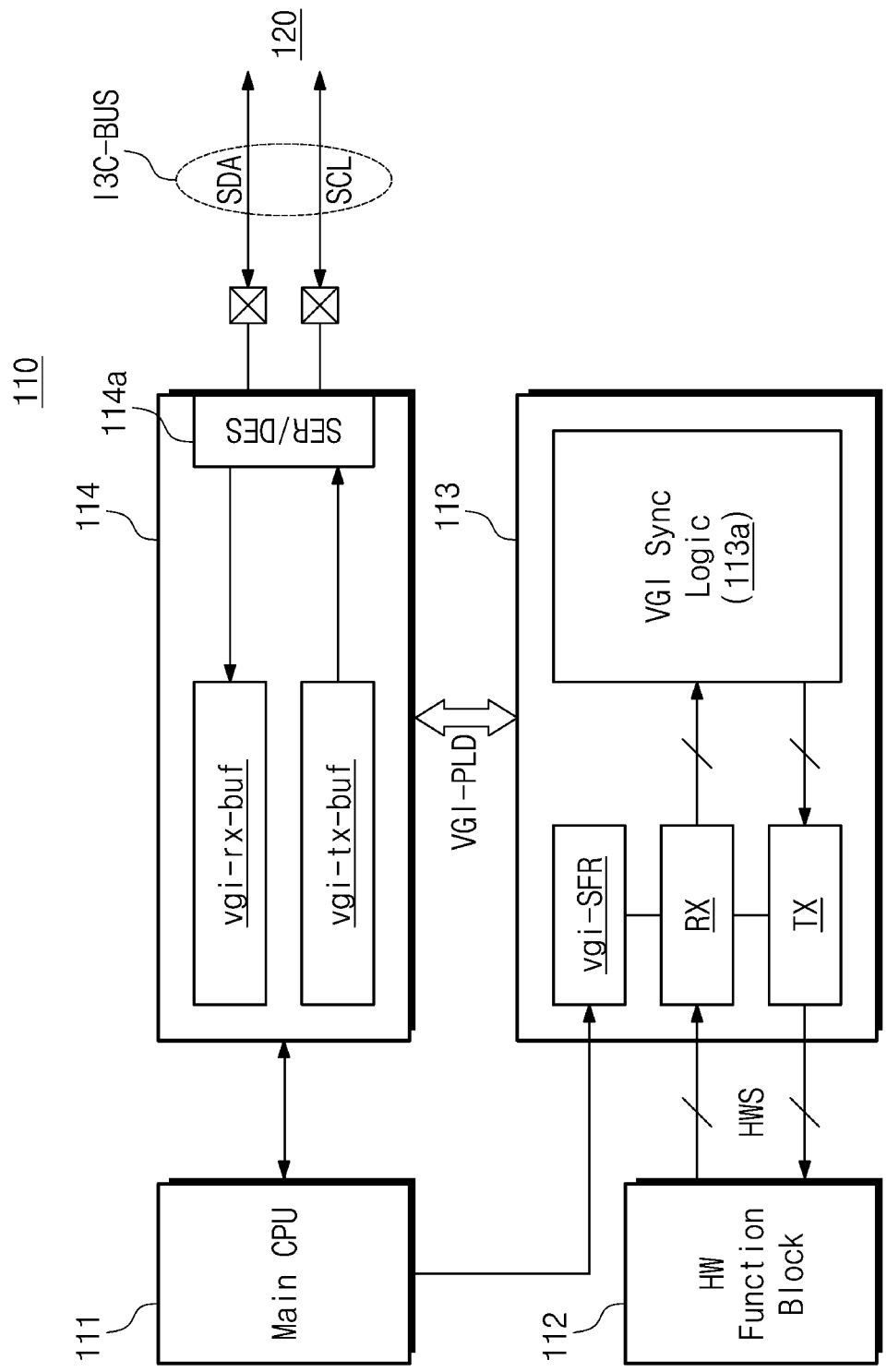
FIG. 3 is a block diagram illustrating an exemplary configuration of a master device of FIG. 2.
Figure 4A:
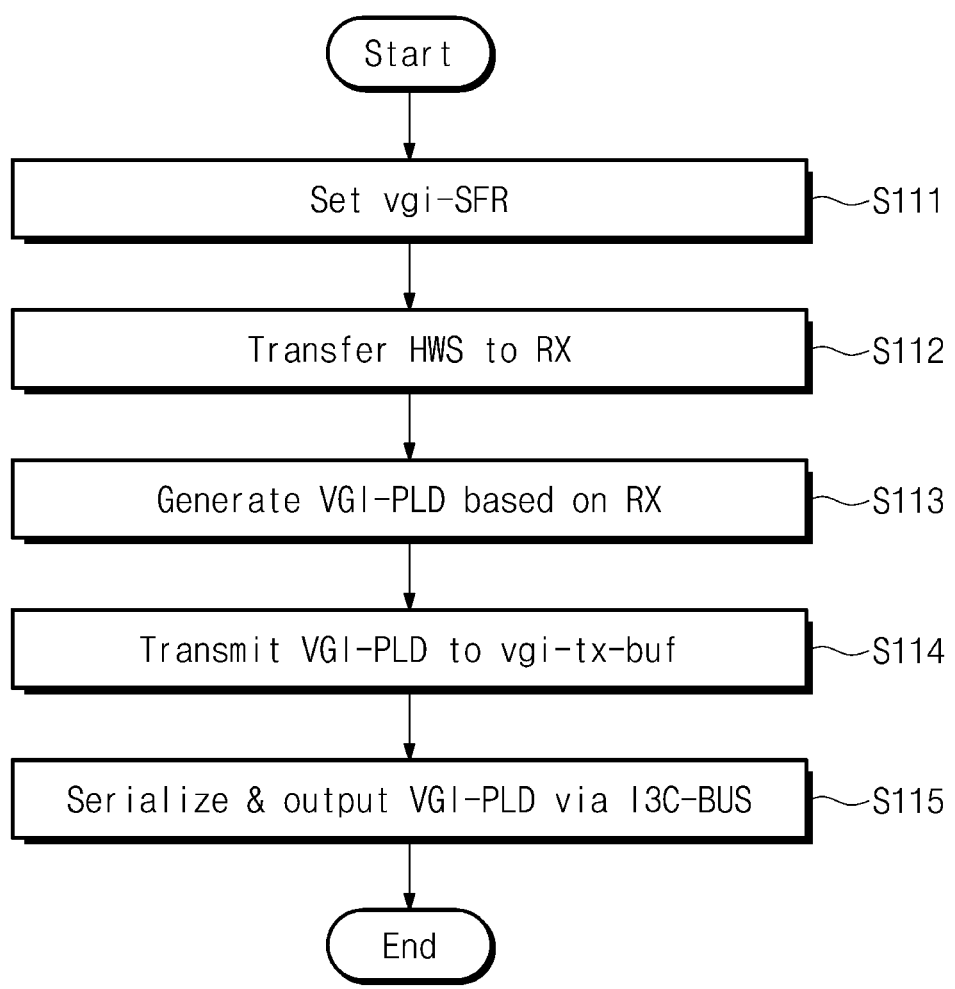
FIGS. 4A and 4B are flowcharts illustrating an exemplary operation of a master device of FIG. 3.
Figure 4B:
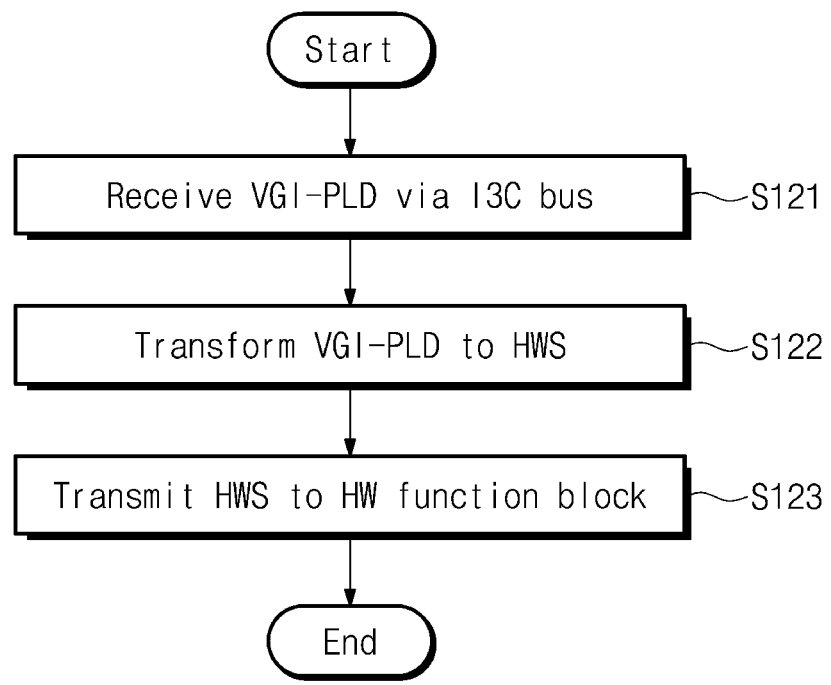

FIG. 3 is a block diagram illustrating an exemplary configuration of a master device of FIG. 2. FIGS. 4A and 4B are flowcharts illustrating an exemplary operation of a master device of FIG. 3. In an example embodiment, an embodiment of the master device 110 will be described with reference to FIG. 3, but the disclosure is not limited thereto. For example, a configuration of the slave device 120 may be similar to the configuration of the master device 110.

Referring to FIGS. 2 and 3, the master device 110 may include the main CPU 111, the hardware function block 112, the VGI FSM 113, and the I3C master block 114. The VGI FSM 113 may include a virtual GPIO specific function register vgi-SFR (hereinafter referred to as a "VGI register"), a receiving unit RX, a transmitting unit TX, and a virtual GPIO sync logic 113a (hereinafter referred to as "VGI sync logic"). The I3C master block 114 may include a virtual GPIO receiving buffer vgi-rx-buf, a virtual GPIO transmitting buffer vgi-tx-buf, and a serializer/deserializer 114a (hereinafter referred to as "SER/DES").

Below, an embodiment in which the virtual GPIO payload VGI-PLD is transmitted from the master device 110 to the slave device 120 through the I3C bus I3C-BUS will be described with reference to FIGS. 2, 3, and 4A.

Referring to FIGS. 2, 3, and 4A, in operation S111, the master device 110 may set the VGI register vgi-SFR. For example, the main CPU 111 may set a VGI register vgi-SFR included in the VGI FSM 113. The main CPU 111 may set masking information about the hardware signals HWS, which are provided from the hardware function block 112, to the VGI register vgi-SFR. In an example embodiment, the masking information may be information that is defined in advance between the master device 110 and the slave device 120.

In operation S112, the master device 110 may transmit the hardware signals HWS to the receiving unit RX. For example, the hardware function block 112 may transmit the hardware signals HWS to the receiving unit RX of the VGI FSM 113. In an example embodiment, the hardware signals HWS may be signals that are based on the GPIO communication manner.

In operation S113, the master device 110 may generate the virtual GPIO payload VGI-PLD based on the receiving unit RX. For example, the VGI sync logic 113a may generate the virtual GPIO payload VGI-PLD based on the hardware signals HWS input to the receiving unit RX. The VGI sync logic 113a may generate the virtual GPIO payload VGI-PLD by transforming the hardware signals HWS input to the receiving unit RX in a predefined order. In an example embodiment, the predefined order may be an order synchronized with the VGI FSM 113 of the slave device 120 (i.e., an order known to the VGI FSM 113 of the slave device 120).

In an example embodiment, the VGI sync logic 113a may continuously monitor a signal change of the receiving unit RX at a predefined interval. In the case where the signal change is detected, the VGI sync logic 113a may generate the virtual GPIO payload VGI-PLD based on the signal change. In an example embodiment, in the case where a part of signal lines of the receiving unit RX is changed, the VGI sync logic 113a may write only information about a changed signal(s) in the virtual GPIO transmitting buffer vgi-tx-buf.

In operation S114, the master device 110 may transmit the virtual GPIO payload VGI-PLD to the virtual GPIO transmitting buffer vgi-tx-buf. For example, the VGI FSM 113 may transmit the generated virtual GPIO payload VGI-PLD to the virtual GPIO transmitting buffer vgi-tx-buf and the virtual GPIO transmitting buffer vgi-tx-buf may temporarily store the virtual GPIO payload VGI-PLD.

In operation S115, the master device 110 may serialize the virtual GPIO payload VGI-PLD and may output the serialized virtual GPIO payload through the I3C bus I3C-BUS (i.e., SDA and SCL). For example, the SER/DES 114*a* may serialize the virtual GPIO payload VGI-PLD temporarily stored in the virtual GPIO transmitting buffer vgi-tx-buf and may output the serialized virtual GPIO payload through the I3C bus I3C-BUS (i.e., the serial data line SDA and the serial clock line SCL).

As described above, the master device 110 may virtualize the GPIO-based hardware signals HWS from the hardware function block 112 to generate the virtual GPIO payload VGI-PLD and may transmit the generated virtual GPIO payload VGI-PLD to the slave device 120 through the I3C bus I3C-BUS. That is, hardware signals based on the GPIO communication manner may be transmitted by using the reduced number of signal lines or the reduced number of signal pins.

Below, an embodiment in which the virtual GPIO payload VGI-PLD is input to the master device 110 from the slave device 120 through the I3C bus I3C-BUS will be described with reference to FIGS. 2, 3, and 4B.

Referring to FIGS. 2, 3, and 4B, in operation S121, the master device 110 may receive the virtual GPIO payload VGI-PLD through the I3C bus I3C-BUS. For example, the SER/DES 114*a* of the I3C master block 114 may receive the virtual GPIO payload VGI-PLD through the I3C bus I3C-BUS. In an example embodiment, the virtual GPIO payload VGI-PLD may be received in an in-band interrupt (IBI) manner based on the I3C protocol. The received virtual GPIO payload VGI-PLD may be temporarily stored in the virtual GPIO receiving buffer vgi-rx-buf.

In operation S122, the master device 110 may transform the virtual GPIO payload VGI-PLD to the hardware signals HWS. For example, the VGI sync logic 113*a* of the VGI FSM 113 may transform the virtual GPIO payload VGI-PLD temporarily stored in the virtual GPIO receiving buffer vgi-rx-buf to the hardware signals HWS recognizable by the hardware function block 112.

In operation S123, the master device 110 may transmit the hardware signals HWS to the hardware function block 112.

As described above, the master device 110 may receive the virtual GPIO payload VGI-PLD through the I3C bus I3C-BUS and may transform the received virtual GPIO payload VGI-PLD to the hardware signals HWS based on the GPIO communication manner. The transformed hardware signals HWS may be provided to the hardware function block 112, and the hardware function block 112 may perform a corresponding operation in response to the received hardware signals HWS.

Although not illustrated in the drawings, an operation of the slave device 120 may be similar to the above-described operation of the master device 110.

Figure 5:
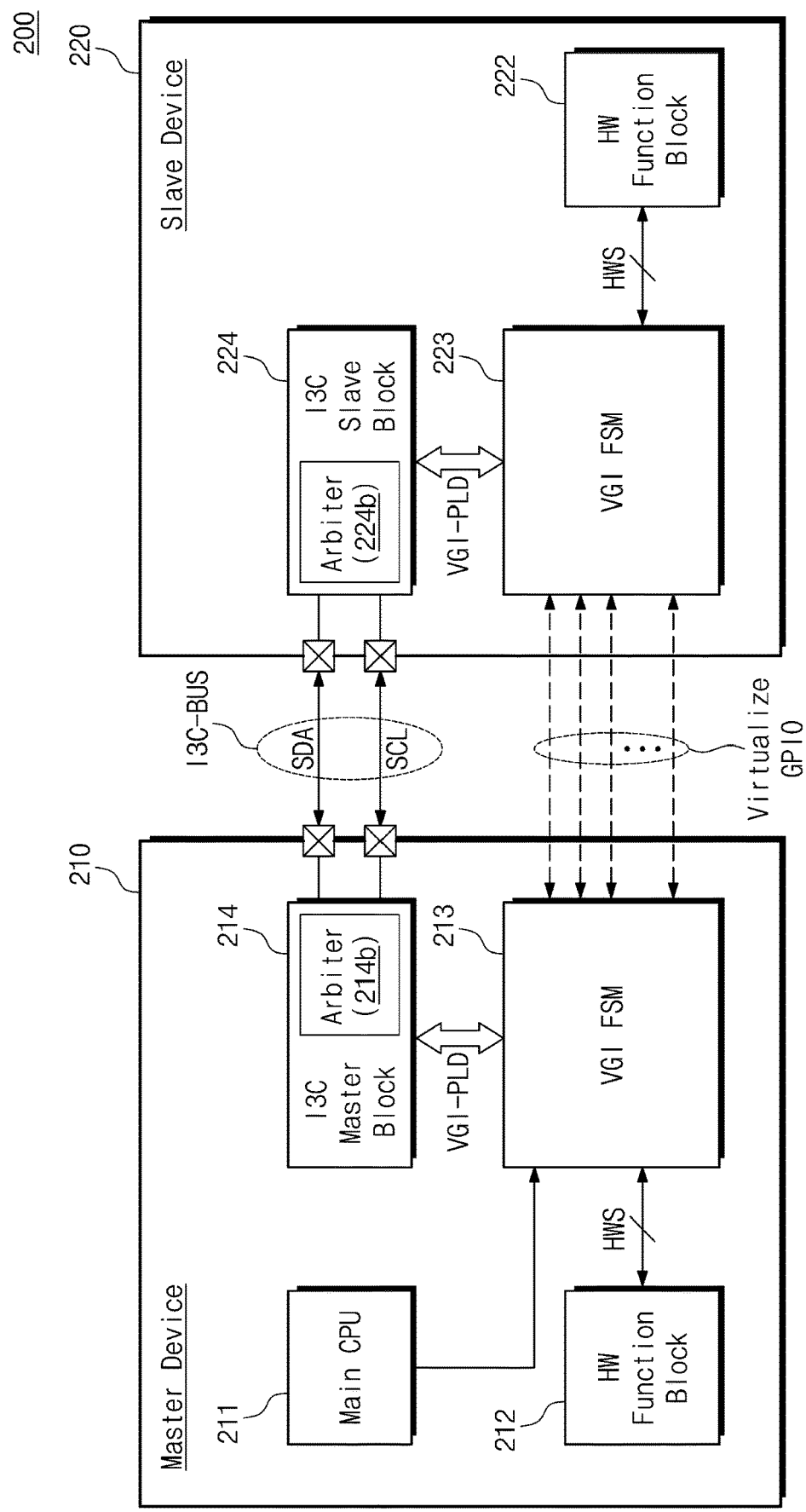
FIG. 5 is a block diagram illustrating an electronic device according to an embodiment of the disclosure.
Figure 6:
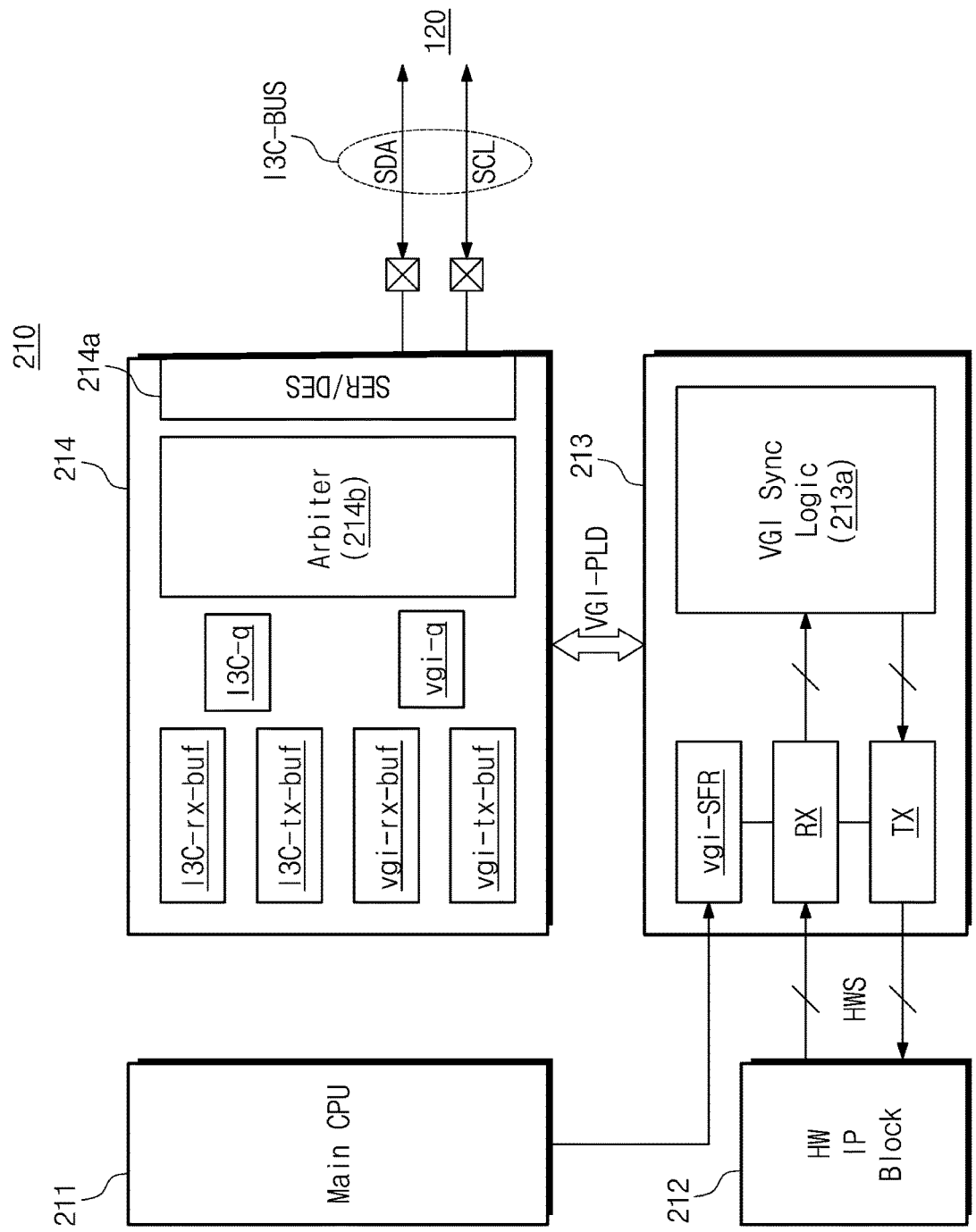
FIG. 6 is a block diagram illustrating a master device of FIG. 5.

FIG. 5 is a block diagram illustrating an electronic device according to an embodiment of the disclosure. FIG. 6 is a block diagram illustrating a master device of FIG. 5. Referring to FIGS. 5 and 6, an electronic device 200 may include a master device 210 and a slave device 220. The master device 210 may include a main CPU 211, a hardware function block 212, a VGI FSM 213, and an I3C master block 214. The slave device 220 may include a hardware function block 222, a VGI FSM 223, and an I3C slave block 224. As illustrated in FIG. 6, the VGI FSM 213 may include a VGI register vgi-SFR, a receiving unit RX, a transmitting unit TX, and VGI sync logic 213*a*. The master device 210, the slave device 220, and the components thereof are described above, and thus, additional description will be omitted to avoid redundancy.

As illustrated in FIGS. 5 and 6, the I3C master block 214 and the I3C slave block 224 may include arbiters 214*b* and 224*b*, respectively. Each of the arbiters 214*b* and 224*b* may be configured to arbitrate I3C-based communication and GPIO-based communication.

For example, as illustrated in FIG. 6, the I3C master block 214 may include an I3C receiving buffer I3C-rx-buf, an I3C transmitting buffer I3C-tx-buf, a virtual GPIO receiving buffer vgi-rx-buf, a virtual GPIO transmitting buffer vgi-tx-buf, an I3C queue I3C-q, a virtual GPIO queue vgi-q, an SER/DES 214*a*, and the arbiter 214*b*.

The remaining components other than the I3C receiving buffer I3C-rx-buf, the I3C transmitting buffer I3C-tx-buf, the I3C queue I3C-q, a virtual GPIO queue vgi-q, and the arbiter 214*b* are described above, and thus, additional description will be omitted to avoid redundancy.

The I3C master block 214 may perform the I3C-based communication with the slave device 220 under control of the main CPU 211. Alternatively, the I3C master block 214 may perform the GPIO-based communication (i.e., the transmitting and receiving of the virtual GPIO payload VGI-PLD) with the slave device 220 through the I3C bus I3C-BUS, without intervention of the main CPU 211. The arbiter 214*b* may prevent communication starvation due to I3C-based communication (hereinafter referred to as "I3C communication") by arbitrating the I3C communication under the control of the main CPU 211 and the GPIO-based communication (hereinafter referred to as "virtual GPIO communication") through the I3C bus I3C-BUS.

For example, the I3C receiving buffer I3C-rx-buf and the I3C transmitting buffer I3C-tx-buf may be set by the main CPU 211 for the purpose of the I3C communication. That is, information for performing the I3C communication may be written in the I3C transmitting buffer I3C-tx-buf by the main CPU 211 or information received through the I3C communication may be written in the I3C receiving buffer I3C-rx-buf. The I3C queue I3C-q may be set based on the I3C receiving buffer I3C-rx-buf and the I3C transmitting buffer I3C-tx-buf.

In an example embodiment, the I3C receiving buffer I3C-rx-buf and the I3C transmitting buffer I3C-tx-buf may include a data receiving buffer, a data transmitting buffer, an interrupt receiving buffer, an interrupt transmitting buffer, etc., and the I3C queue I3C-q may include a command queue, a response queue, an interrupt queue, etc.

The virtual GPIO queue vgi-q may be set by the VGI FSM 213. For example, in the case where the VGI FSM 213 generates the virtual GPIO payload VGI-PLD, the VGI FSM 213 may write the generated virtual GPIO payload VGI-PLD in the virtual GPIO transmitting buffer vgi-tx-buf and may set the virtual GPIO queue vgi-q.

The arbiter 214*b* may perform an arbitration operation such that corresponding communication is performed based on the I3C queue I3C-q and the virtual GPIO queue vgi-q. For example, in the case where the I3C queue I3C-q is set (i.e., in the case where the I3C communication is required by the main CPU 211), the arbiter 214*b* may perform the I3C communication with the slave device 220 through the I3C bus I3C-BUS, based on the I3C receiving buffer I3C-rx-buf or the I3C transmitting buffer I3C-tx-buf. In the case where the I3C queue I3C-q is not set and the virtual GPIO queue vgi-q is set (i.e., in the case where the GPIO communication (or virtual GPIO communication) is required by the hardware function block 212), the arbiter 214*b* may perform the virtual GPIO communication through the I3C bus I3C-BUS based on the virtual GPIO receiving buffer vgi-rx-buf and the virtual GPIO transmitting buffer vgi-tx-buf.

In an example embodiment, priorities between operations included in each of the I3C queue I3C-q and the virtual GPIO queue vgi-q may be variously set. For example, a virtual GPIO transmitting operation included in the virtual GPIO queue vgi-q may have a higher priority than an in-band interrupt (IBI) operation included in the I3C queue I3C-q and may have a lower priority than an I3C master transmitting operation included in the I3C queue I3C-q.

The SER/DES 214a may transmit/receive a corresponding signal through the I3C bus I3C-BUS based on buffers corresponding to a communication manner arbitrated by the arbiter 214b.

In an example embodiment, in the case where the I3C communication is continuously performed by the main CPU 211, the virtual GPIO communication may not be performed. In this case, the hardware function block 212 of the master device 210 may fail to normally communicate with the hardware function block 222 of the slave device 220. As described above, the arbiter 214b may differently set a priority of the I3C communication and a priority of the virtual GPIO communication and may sequentially or randomly perform the I3C communication and the virtual GPIO communication based on the priorities thus set. In an example embodiment, in the case where a size of the number of virtual GPIO operations set to the virtual GPIO queue vgi-q is equal to or greater than a reference value, the arbiter 214b may be configured to perform the virtual GPIO communication first of all.

Figure 7A:
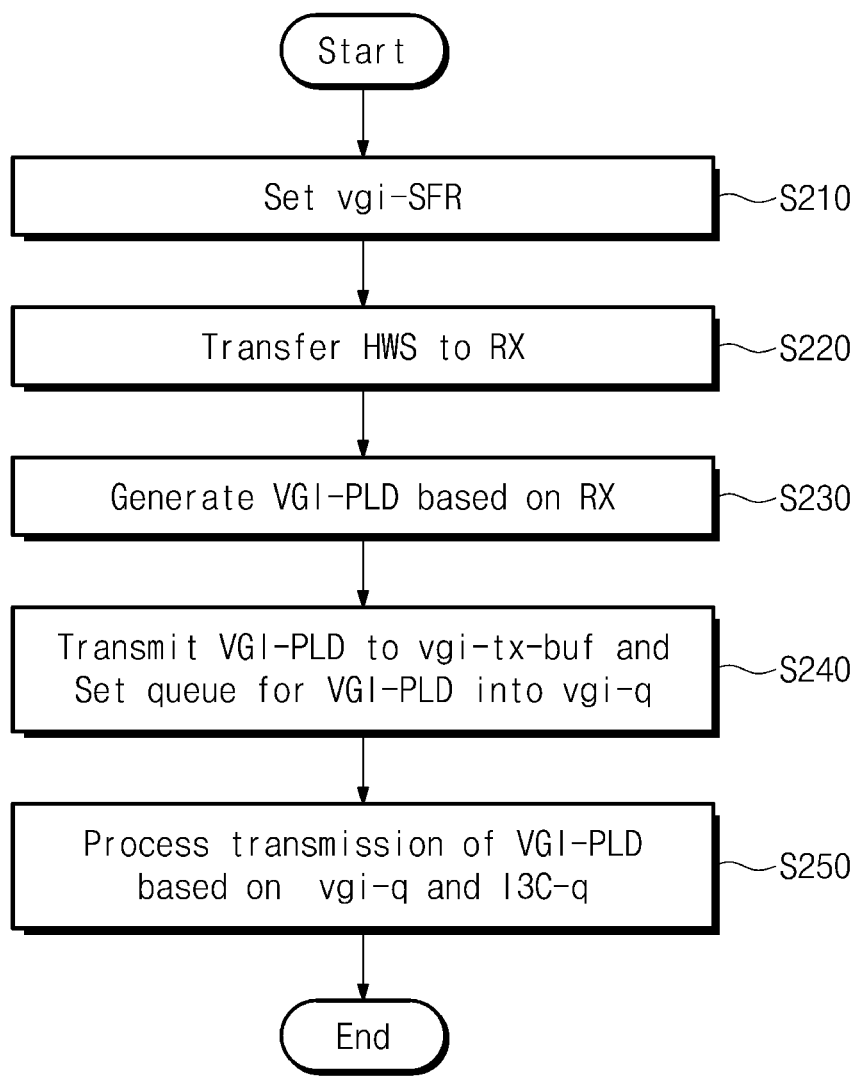
FIGS. 7A and 7B are flowcharts illustrating an exemplary operation of a master device of FIG. 6.
Figure 7B:
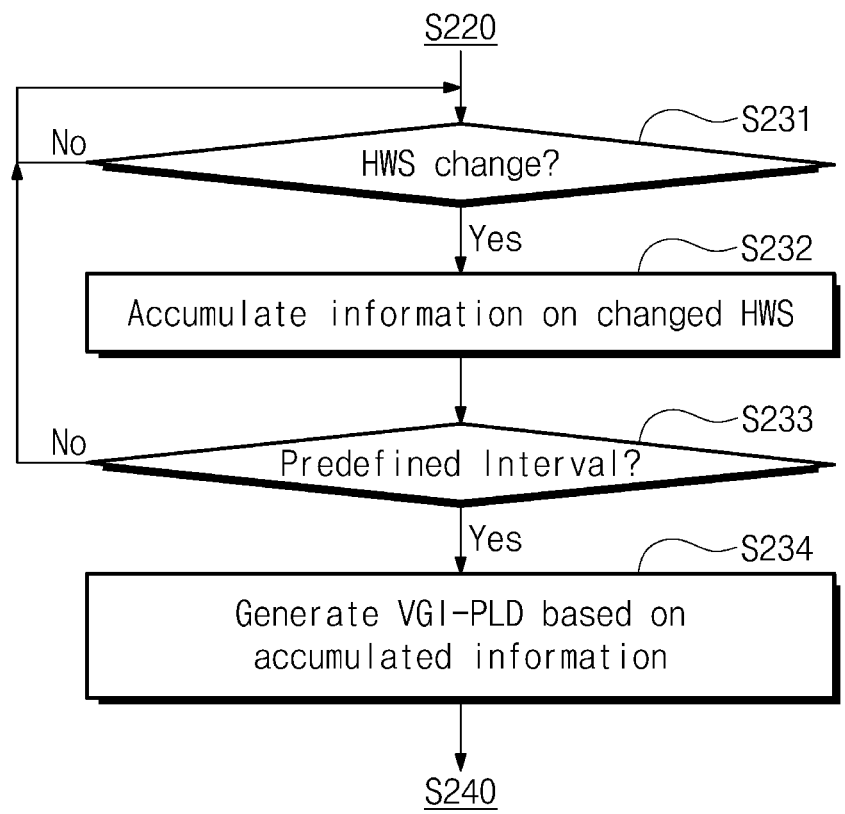

FIGS. 7A and 7B are flowcharts illustrating an exemplary operation of a master device of FIG. 6. Referring to FIGS. 6 and 7A, the master device 210 may perform operation S210 to operation S230. Operation S210 to operation S230 may be similar to operation S111 to operation S113 of FIG. 6, and thus, additional description will be omitted to avoid redundancy.

In operation S240, the master device 210 may transmit the virtual GPIO payload VGI-PLD to the virtual GPIO transmitting buffer vgi-tx-buf and may set a queue for the virtual GPIO payload VGI-PLD to the virtual GPIO queue vgi-q.

In operation S250, the master device 210 may process the transmission of the virtual GPIO payload VGI-PLD based on the virtual GPIO queue vgi-q and the I3C queue I3C-q. For example, the arbiter 214b may perform the I3C communication or the virtual GPIO communication based on priorities of operations included in the virtual GPIO queue vgi-q and the I3C queue I3C-q.

As described above, according to an embodiment of the disclosure, the I3C master block 214 may perform the I3C communication under control of the main CPU 211 or may perform the virtual GPIO communication based on the virtual GPIO payload VGI-PLD generated from the VGI FSM 213. In this case, the arbiter 214b of the I3C master block 214 may be configured to arbitrate the I3C communication and the virtual GPIO communication based on the I3C queue I3C-q and the virtual GPIO queue vgi-q, such that the communication starvation due to the I3C communication does not occur.

In an example embodiment, in the case where the virtual GPIO payload VGI-PLD is continuously changed, the virtual GPIO queue vgi-q may be full. In this case, the virtual GPIO payload VGI-PLD may not be transmitted/received normally. To prevent this, the VGI FSM 213 may be configured to set the virtual GPIO queue vgi-q every predefined interval.

For example, as illustrated in FIG. 7B, after operation S220, the master device 210 may perform operation S231 to operation S234. Operation S231 to operation S234 may be included in operation S230 of FIG. 7A.

In operation S231, the master device 210 may determine whether at least one of the hardware signals HWS is changed. For example, as described with reference to FIG. 4A, the VGI sync logic 213a may monitor the hardware signals HWS provided through the receiving unit RX. In the case where the hardware signals HWS are not changed, the master device 210 may repeat operation S231.

When at least a part of the hardware signals HWS is changed, in operation S232, the master device 210 may accumulate information about the changed hardware signals. For example, in the case where a signal corresponding to a first GPIO among the hardware signals HWS is changed, the VGI sync logic 213a may change information corresponding to the first GPIO.

In operation S233, the master device 210 may determine whether a predefined interval is elapsed. For example, the predefined interval may indicate an interval to set the virtual GPIO queue vgi-q. The predefined interval may be variously set. For example, the predefined interval may be set to an interval of 5 us (micro-seconds) within a range from 0 to 160 us, but the disclosure is not limited thereto. In an example embodiment, whether the predefined interval is elapsed from a time when the virtual GPIO queue vgi-q is set previously or immediately previously may be determined.

When the predefined time is not elapsed, the process may proceed to operation S231.

When the predefined interval is elapsed, in operation S234, the master device 210 may generate the virtual GPIO payload VGI-PLD based on the accumulated information. For example, as described above, the accumulated information includes information about the changed signals. The VGI FSM 213 may generate the virtual GPIO payload VGI-PLD based on the changed signals.

Afterwards, the generated virtual GPIO payload VGI-PLD may be stored in the virtual GPIO transmitting buffer vgi-tx-buf and the virtual GPIO queue vgi-q may be set.

As described above, as the virtual GPIO queue vgi-q is set every predefined interval, the virtual GPIO queue vgi-q may be normally maintained in a situation where a hardware signal is continuously changed.

Figure 8A:
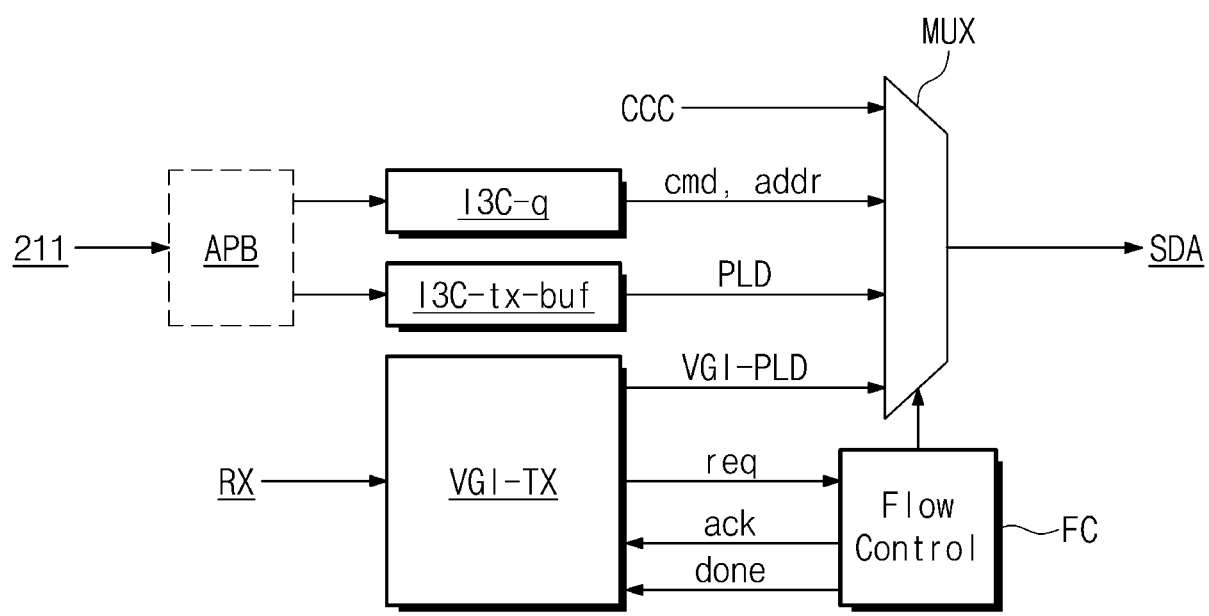
FIGS. 8A to 8C are exemplary diagrams for describing a transmitting path and a receiving path of virtual GPIO communication of the master device of FIG. 6.
Figure 8B:
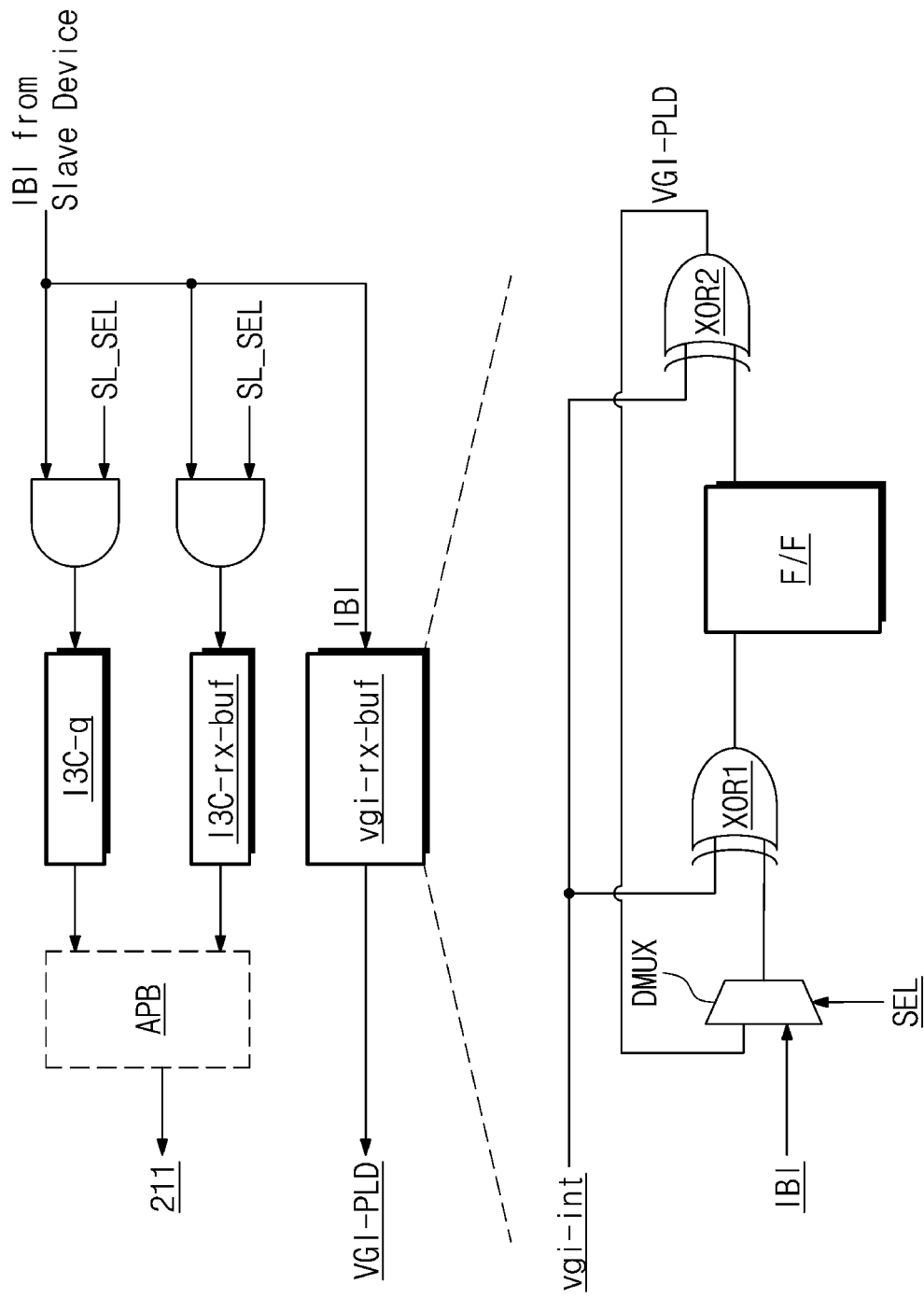
Figure 8C:
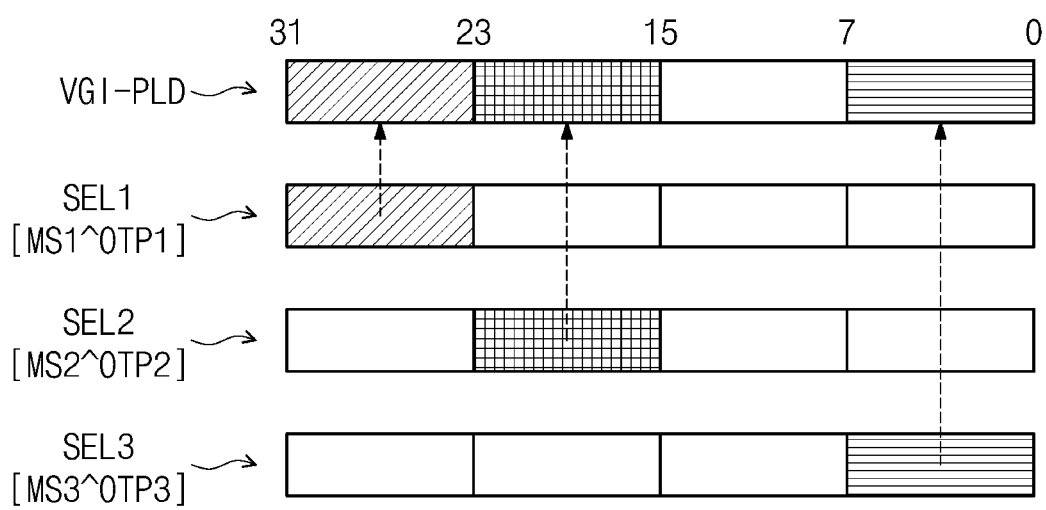

FIGS. 8A to 8C are exemplary diagrams for describing a transmitting path and a receiving path of virtual GPIO communication of the master device 210 of FIG. 6. Below, for brevity of illustration and convenience of description, components that are unnecessary to describe each embodiment are omitted. In an example embodiment, components illustrated in FIGS. 8A to 8C are used to describe how transmission and reception are made through virtual GPIO communication according to an embodiment of the disclosure. That is, the components illustrated in FIGS. 8A to 8C may be expressed or described differently from the above-described components but may be understood as performing substantially similar functions.

Referring to FIGS. 6 and 8A, the main CPU 211 may set a command cmd and an address addr for a slave device to the I3C queue I3C-q through a system bus APB, and may set information (i.e., a payload PLD) to be transmitted to the I3C transmitting buffer I3C-tx-buf. In an example embodiment, the system bus APB is not illustrated in FIG. 6, but the system bus APB may be used for a signal transfer or communication between respective components of the master device 210.

A VGI transmitting unit VGI-TX may be configured to perform the above-described functions of the VGI sync logic 213a and the virtual GPIO transmitting buffer vgi-tx-buf.

For example, the VGI transmitting unit VGI-TX may sense a change in the hardware signal HWS from the receiving unit RX to generate the virtual GPIO payload VGI-PLD. The VGI transmitting unit VGI-TX may provide the virtual GPIO payload VGI-PLD to a multiplexer MUX under control of a flow controller FC. For example, in the case where the change in the hardware signal HWS from the receiving unit RX is sensed, the VGI sync logic 213a may provide a request signal req to the flow controller FC. The flow controller FC may provide an acknowledge signal ack to the VGI sync logic 213a in response to the request signal req. The VGI sync logic 213a may be configured to set a value corresponding to a changed signal of the hardware signals HWS as the virtual GPIO payload VGI-PLD in response to the acknowledge signal ack (i.e., a function of the virtual GPIO transmitting buffer vgi-tx-buf). Afterwards, the VGI transmitting unit VGI-TX may provide the virtual GPIO payload VGI-PLD to the multiplexer MUX in response to a done signal done of the flow controller FC.

The multiplexer MUX may receive the command cmd and the address addr from the I3C queue I3C-q, may receive the payload PLD from the I3C transmitting buffer I3C-tx-buf, and may receive the virtual GPIO payload VGI-PLD from the VGI transmitting unit VGI-TX. Under control of the flow controller FC, the multiplexer MUX may serialize the received signals so as to be output to the serial data line SDA.

In an example embodiment, in the case where the virtual GPIO payload VGI-PLD is output from the multiplexer MUX, a common command code CCC may be used. The common command code CCC may be used for communication (or broadcasting) of the master device 210 with respect to all or a part of slave devices connected thereto. The slave devices may receive the virtual GPIO payload VGI-PLD by recognizing the common command code CCC. In an example embodiment, the common command code CCC may be defined in the VGI register vgi-SFR.

In an example embodiment, the change in the hardware signal HWS may be ignored from a time when the request signal req is transmitted to a time when the acknowledge signal ack is received.

As described above, the master device 210 may be configured to sense a change in the hardware signal HWS, to generate the virtual GPIO payload VGI-PLD based on a sensing result, and to perform the virtual GPIO communication based on the virtual GPIO payload VGI-PLD.

Referring to FIGS. 6 and 8B, an in-band-interrupt IBI may be received from the slave device 220. Information of the in-band-interrupt IBI may be combined with a slave select signal SL_SEL, such that the slave address addr is stored in the I3C queue I3C-q (in detail, an in-band-interrupt queue) and the payload PLD is stored in the I3C receiving buffer I3C-rx-buf (in detail, an in-band-interrupt receiving buffer).

In an example embodiment, the slave select signal SL_SEL may be determined by a combination of a value of the VGI register vgi-SFR for identifying the slave device 220 and a value of storing the in-band-interrupt IBI in the I3C queue I3C-q and I3C receiving buffer I3C-rx-buf.

In an example embodiment, the in-band-interrupt IBI from the slave device 220 may be provided to the virtual GPIO receiving buffer vgi-rx-buf and the virtual GPIO receiving buffer vgi-rx-buf may buffer the received information to output the virtual GPIO payload VGI-PLD.

For example, a multiplexer DMUX included in the virtual GPIO receiving buffer vgi-rx-buf may be configured to output any one of a signal (i.e., the in-band-interrupt IBI) received from the slave device 220 and a signal output from a second XOR gate XOR2, in response to a select signal SEL.

A first XOR gate XOR1 may output a result value obtained by performing an XOR operation on an output value of the demultiplexer DMUX and a virtual GPIO initial value vgi-int. The result value of the first XOR gate XOR1 may be stored in a flip-flop F/F. The second XOR gate XOR2 may output a result value, which is obtained by performing an XOR operation on the value stored in the flip-flop F/F and the virtual GPIO initial value vgi-int, as the virtual GPIO payload VGI-PLD.

According to the above-described operation of the VGI sync logic 213a, in an initial operation, the virtual GPIO payload VGI-PLD may have the virtual GPIO initial value vgi-int. Afterwards, in the case where a value of a signal (i.e., the in-band-interrupt IBI) selected by the select signal SEL is changed, the virtual GPIO payload VGI-PLD may be changed to a corresponding value.

In an example embodiment, the select signal SEL may be determined by masking information set to the VGI register vgi-SFR, initially set masking information (e.g., masking information set as OTP (one-time programmable) data), or a combination thereof.

As described above, the VGI sync logic 213a may receive the virtual GPIO payload VGI-PLD based on the in-band-interrupt IBI from the slave device 220 and may generate the GPIO-based hardware signals HWS by using the received virtual GPIO payload VGI-PLD.

A method in which one master device performs the virtual GPIO communication with a plurality of slave devices will be described with reference to FIGS. 6, 8B, and 8C. For example, the virtual GPIO payload VGI-PLD respectively provided from a plurality of slave devices may be differently specified by differently setting masking information to each of the plurality of slave devices.

For example, it is assumed that one master device 210 receives the virtual GPIO payload VGI-PLD from three slave devices and the virtual GPIO payload VGI-PLD is composed of 32 bits. In this case, bits [31:24] may be designated for a first slave device, bits [23:16] may be designated for a second slave device, and bits [7:0] may be designated for a third slave device.

In other words, bits [31:24] of signals received from the first slave device may be mapped onto bits [31:24] of the virtual GPIO payload VGI-PLD, bits [23:16] of signals received from the second slave device may be mapped onto bits [23"16] of the virtual GPIO payload VGI-PLD, and bits [7:0] of signals received from the first slave device may be mapped onto bits [7:0] of the virtual GPIO payload VGI-PLD. The virtual GPIO payload VGI-PLD may be generated by combining signals received from respective slave devices.

In this case, first to third select signals SEL1 to SEL3 may be determined to implement the above-described bit mapping. For example, the first select signal SEL1 may be determined by a combination of first masking information MS1 and first OTP data OTP1, the second select signal SEL2 may be determined by a combination of second masking information MS2 and second OTP data OTP2, and the third select signal SEL3 may be determined by a combination of third masking information MS3 and third OTP data OTP3. The first to third masking information MS1 to MS3 may indicate a value set to the VGI register vgi-SFR with regard to the first to third slave devices, and the first to third OTP data OTP1 to OTP3 may indicate values set in advance with respect to the first to third slave devices.

Figure 9:
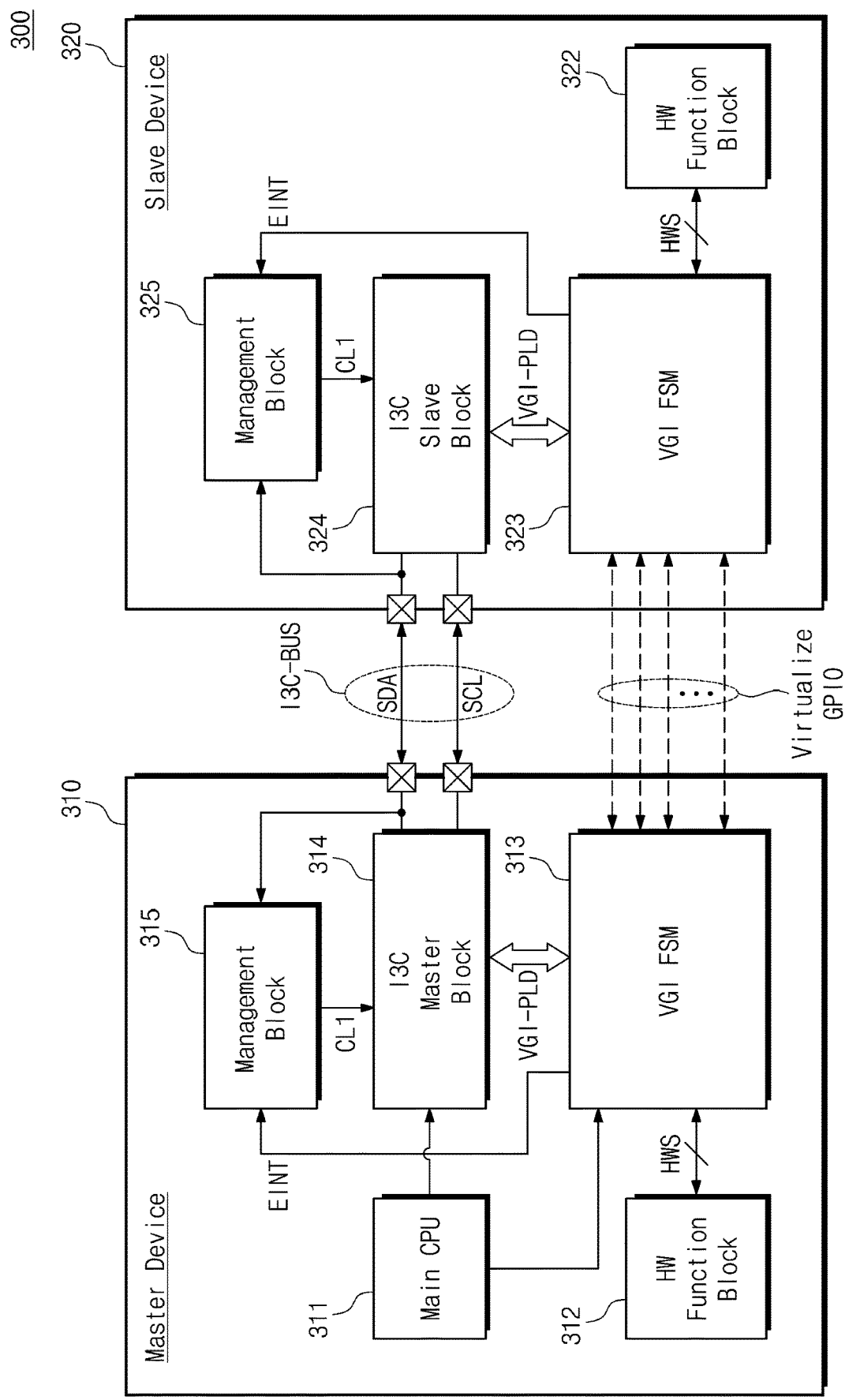
FIG. 9 is a block diagram illustrating an electronic device according to an embodiment of the disclosure.

FIG. 9 is a block diagram illustrating an electronic device according to an embodiment of the disclosure. Referring to FIG. 9, an electronic device 300 may include a master device 310 and a slave device 320. The master device 310 may include a main CPU 311, a hardware function block 312, a VGI FSM 313, an I3C master block 314, and a management block 315. The slave device 320 may include a hardware function block 322, a VGI FSM 323, an I3C slave block 324, and a management block 325.

As in the above description, the master device 310 and the slave device 320 may perform the I3C communication under the control of the main CPU 311 and the virtual GPIO communication, in which the main CPU 311 or separate software does not intervene, through the I3C bus I3C-BUS. Embodiments performing the above-described operation are described above, and thus, additional description will be omitted to avoid redundancy.

The master device 310 and the slave device 320 of FIG. 9 may include the management block 315 and the management block 325, respectively. The management block 315 and the management block 325 may be configured to manage a power or communication of the master device 310 and the slave device 320, respectively.

For example, in the case where the master device 310 is in a sleep mode, power or a clock that is provided to the main CPU 311, the hardware function block 312, the VGI FSM 313, and the I3C master block 314 included in the master device 310 may be blocked. That is, in the case where the master device 310 is in the sleep mode, a low-power mode of the master device 310 may be maintained by blocking the power or the clock that is provided to the components included in the master device 310. In an example embodiment, in the case where the master device 310 is in the sleep mode, all or a part of components in the management block 315 may maintain an on-state. That is, all or a part of the components in the management block 315 may be included in an always-on domain.

In a state where the master device 310 is in the sleep mode, the transmission of the virtual GPIO payload VGI-PLD may be requested from the slave device 320. For example, to transmit the virtual GPIO payload VGI-PLD to the master device 310, the slave device 320 (in particular, the I3C slave block 324) may pull down a level of the serial data line SDA of the I3C bus I3C-BUS to "low". The management block 315 of the master device 310 may detect a level of the serial data line SDA (i.e., a low level being pulled down) and may provide a first clock CL1 to the I3C master block 314. In an example embodiment, the first clock CL1 may be a clock that is provided from an RCO included in the management block 315. The RCO may maintain a driving state even though the master device 310 is in the sleep mode.

The I3C master block 314 may wake up based on the first clock CL1. The I3C master block 314 that wakes up may detect a level of the serial data line SDA (i.e., a low level being pulled down), and in response to the detected level, the I3C master block 314 may perform a following operation to receive the virtual GPIO payload VGI-PLD from the slave device 320.

In an example embodiment, although not illustrated in drawings, the management block 315 may transmit a main clock to the VGI FSM 313 in response to the detected level (i.e., a low level being pulled down) of the serial data line SDA. The VGI FSM 313 may wake up in response to the main clock. The VGI FSM 313 that wakes up may transform the received virtual GPIO payload VGI-PLD to the hardware signals HWS.

In an example embodiment, in the case where a signal received from the slave device 320 includes an external interrupt signal EINT, the VGI FSM 313 may provide the external interrupt signal EINT to the management block 315. The management block 315 may wake up the whole master device 310 in response to the external interrupt signal EINT. In an example embodiment, the external interrupt signal EINT may correspond to at least one bit of an order that is defined in advance between the master device 310 and the slave device 320. Information about the order of the external interrupt signal EINT may be stored in or set to the VGI register vgi-SFR as masking information.

As described above, in the sleep mode of the master device 310, in the case where the reception of data from the slave device 320 is required, information may be transmitted/received from the slave device 320 without a wake-up of the whole master device 310. Accordingly, a power of the electronic device 300 may be efficiently managed.

In an example embodiment, components in the slave device 320 may be similar to the above-described components of the master device 310, or operations of the components in the slave device 320 may be similar to the above-described operations of the components of the master device 310. Thus, additional description will be omitted to avoid redundancy.

Figure 10:
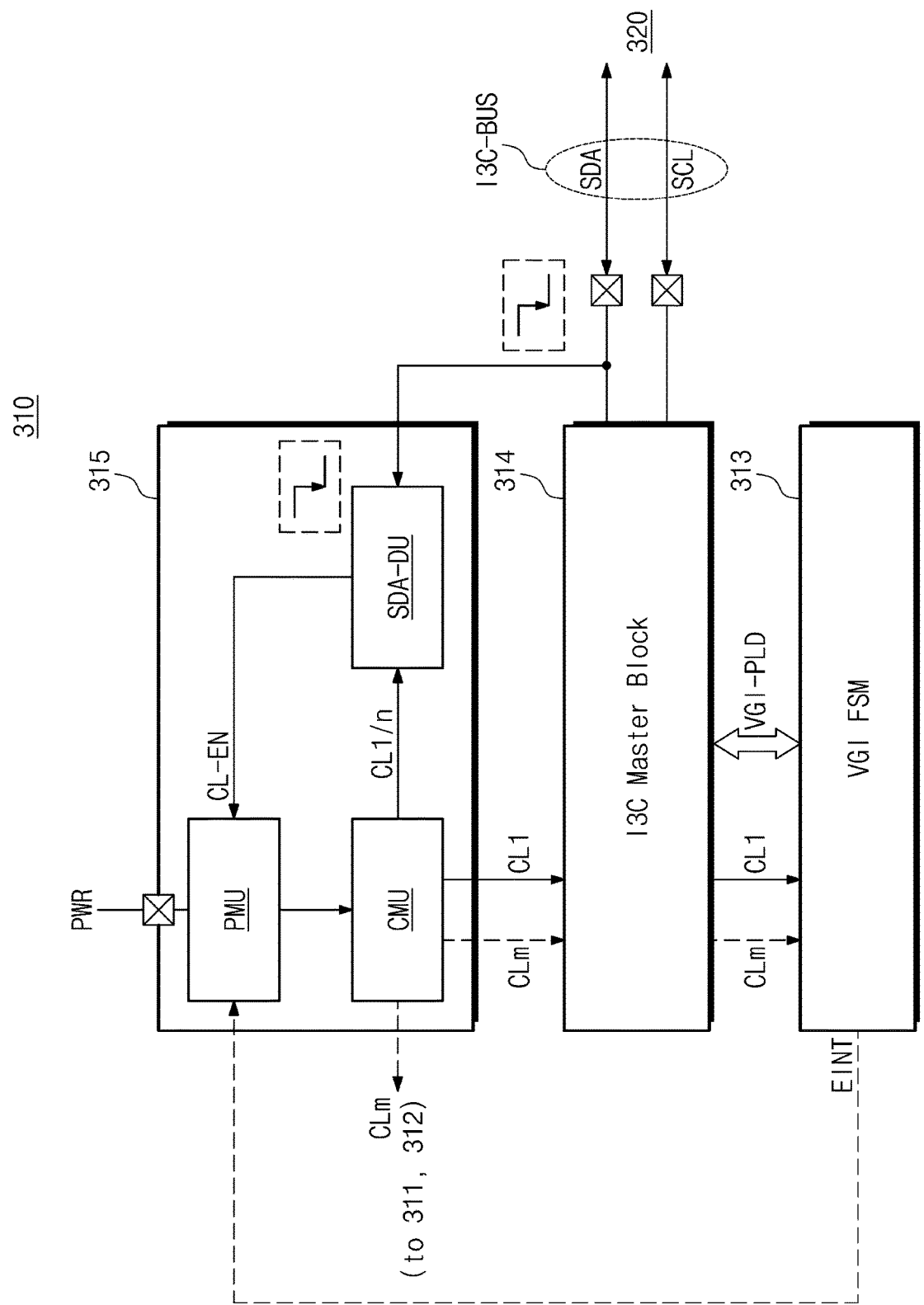
FIG. 10 is a block diagram illustrating a management block of a master device of FIG. 9.

FIG. 10 is a block diagram illustrating a management block of a master device of FIG. 9. For brevity of illustration, components that are unnecessary to describe a configuration of the management block 315 are omitted. Referring to FIGS. 9 and 10, the master device 310 may include the VGI FSM 313, the I3C master block 314, and the management block 315. The management block 315 may include a serial data line detection unit SDA-DU, a clock management unit CMU, and a power management unit PMU.

In the case where the master device 310 is in the sleep mode, a power and a main clock that are provided to the remaining components of the master device 310 other than some components of the management block 315 may be blocked. For example, the clock management unit CMU of the management block 315 may include an RCO that operates regardless of a sleep mode of the master device 310. The RCO may generate the first clock CL1. In an example embodiment, in the case where the master device 310 is in a normal mode, the clock management unit CMU may provide a main clock CLm to each component of the master device 310.

The first clock CL1 generated from the RCO included in the clock management unit CMU may be provided to the serial data line detection unit SDA-DU. In an example embodiment, in the sleep mode of the master device 310, a clock provided to the serial data line detection unit SDA-DU may be a clock CL1/n that is generated by dividing the first clock CL1 as much as n times. That is, the serial data line detection unit SDA-DU may operate by using the divided clock CL1/n.

The serial data line detection unit SDA-DU may be configured to detect a level of the serial data line SDA. For example, in the case where the slave device 320 transmits data or information (e.g., a virtual GPIO payload) through the I3C bus (i.e., SDA and SCL), the slave device 320 may pull down the level of the serial data line SDL to a low level.

The serial data line detection unit SDA-DU may be configured to detect the level of the serial data line SDA thus pulled down. The serial data line detection unit SDA-DU may provide a clock enable signal CL-EN to the power management unit PMU in response to the detected low level.

The power management unit PMU may control the clock management unit CMU such that the clock management unit CMU provides the first clock CL1 to the I3C master block 314 and the VGI FSM 313. For example, the power management unit PMU may receive external power PWR from an external device (e.g., an external PMIC or a battery) and may provide power, which is necessary for the components of the master device 310 to operate, based on the received external power PWR. The power management unit PMU may provide power, which is necessary to supply the first clock CL1, to the clock management unit CMU in response to the clock enable signal CL-EN.

The clock management unit CMU may provide the first clock CL1 to the I3C master block 314 and the VGI FSM 313 under control of the power management unit PMU. As described above, the first clock CL1 may be a clock that is generated from the RCO belonging to the always-on domain. That is, even though the first clock CL1 is provided to the I3C master block 314 and the VGI FSM 313, the sleep mode of the master device 310 may be maintained.

The I3C master block 314 and the VGI FSM 313 may wake up in response to the first clock CL1. The I3C master block 314 and the VGI FSM 313 that wake up may receive data or information (e.g., the virtual GPIO payload VGI-PLD) from the slave device 320 and may process the received data or information.

For example, the I3C master block 314 that wakes up may receive data from the slave device 320 based on an in-band-interrupt manner In detail, the I3C master block 314 that wakes up may pull down the serial clock line SCL in response to the low level of the serial data line SDA thus pulled down. Afterwards, the I3C master block 314 may receive data or information from the slave device 320 through the serial data line SDA and the serial clock line SCL.

The VGI FSM 313 that wakes up may transform data received from the I3C master block 314, in particular, the virtual GPIO payload VGI-PLD to the hardware signals HWS.

In an example embodiment, in the case where only the external interrupt signal EINT is received from the slave device 320, the external interrupt signal EINT may be provided to the power management unit PMU. The power management unit PMU may wake up all the components of the master device 310 in response to the external interrupt signal EINT. For example, in response to the external interrupt signal EINT, the power management unit PMU may control the clock management unit CMU such that the clock management unit CMU outputs the main clock CLm or may supply a power necessary for the components of the master device 310 to operate.

The clock management unit CMU may output the main clock CLm under control of the power management unit PMU. The main clock CLm may be provided to various components of the master device 310, and each component may operate based on the main clock CLm.

Figure 11:
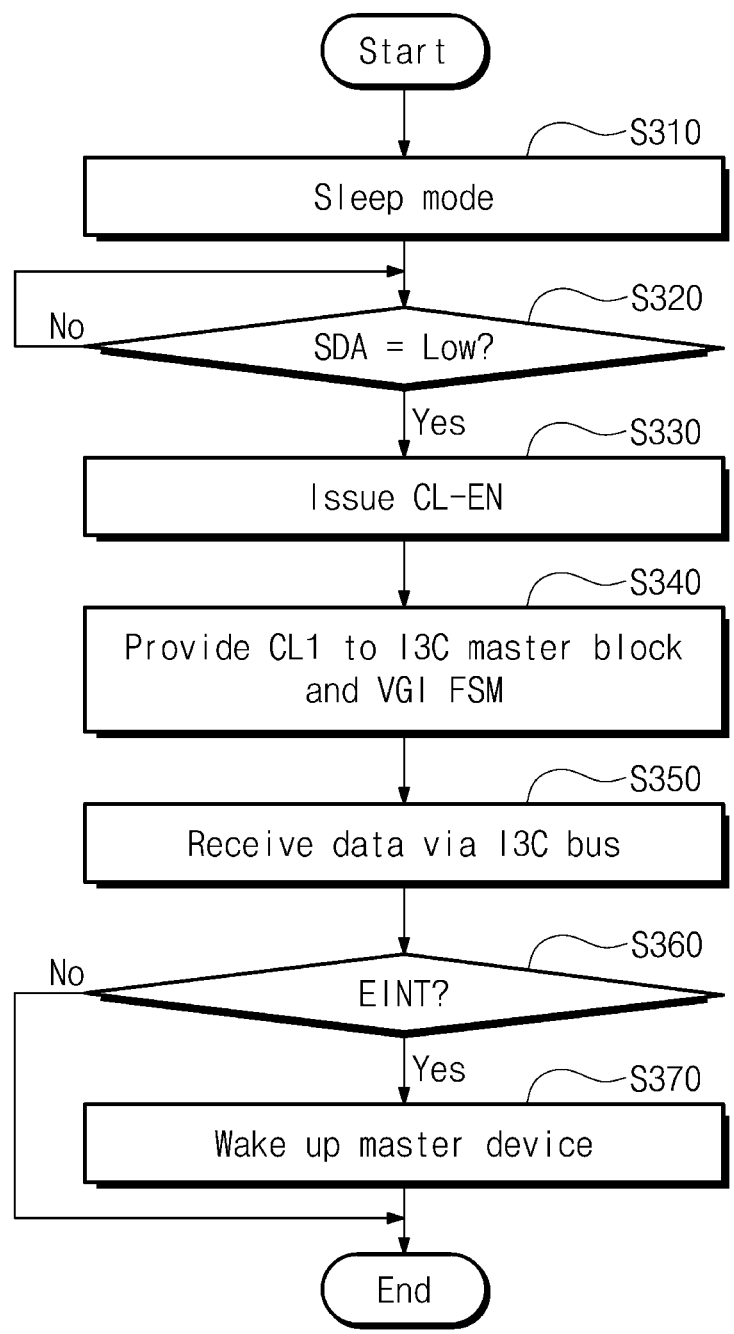
FIG. 11 is a flowchart illustrating an operation of a master device of FIG. 10.

FIG. 11 is a flowchart illustrating an operation of a master device of FIG. 10. Referring to FIGS. 9 to 11, in operation S310, the master device 310 may enter the sleep mode. For example, a clock or power that is provided to the remaining components of the master device 310 other than some components (e.g., the RCO of the clock management unit CMU or the serial data line detection unit SDA-DU) may be blocked.

In operation S320, the master device 310 may detect a level of the serial data line SDA. For example, the serial data line detection unit SDA-DU may detect whether the level of the serial data line SDA is pulled down to the low level.

When the level of the serial data line SDA is not pulled down to the low level, the master device 310 (e.g., the serial data line detection unit SDA-DU) may continue operation S320.

When the level of the serial data line SDA is pulled down to the low level (i.e., in the case where the serial data line detection unit SDA-DU detects that the level of the serial data line SDA is pulled down to the low level), in operation S330 the master device 310 may generate the clock enable signal CL-EN. For example, the serial data line detection unit SDA-DU may generate the clock enable signal CL-EN in response to the event that the level of the serial data line SDA is pulled down to the low level.

In operation S340, the master device 310 may provide the first clock CL1 to the I3C master block 314 and the VGI FSM 313. For example, the power management unit PMU may control the clock management unit CMU such that the first clock CL1 is provided to the I3C master block 314 and the VGI FSM 313 in response to the clock enable signal CL-EN. The clock management unit CMU may provide the first clock CL1 to the I3C master block 314 and the VGI FSM 313 under control of the power management unit PMU.

In an example embodiment, the first clock CL1 may be a clock that is generated from an RCO operating regardless of a state (i.e., a sleep mode) of the master device 310. That is, even though the I3C master block 314 and the VGI FSM 313 wake up as the first clock CL1 may be provided to the I3C master block 314 and the VGI FSM 313, the master device 310 may maintain the sleep mode.

In operation S350, the master device 310 may receive data through the I3C bus I3C-BUS (i.e., SDA and SCL). For example, the I3C master block 314 that wakes up in response to the first clock CL1 may receive data (e.g., the virtual GPIO payload VGI-PLD) from the slave device 320 by using the in-band-interrupt (IBI) manner.

In an example embodiment, the VGI FSM 313 may transform the received data to the hardware signals HWS or the master device 310 may perform an operation corresponding to the received data.

In operation S360, the master device 310 may determine whether the received data includes the external interrupt signal EINT. For example, the VGI register vgi-SFR of the master device 310 may include masking information. The masking information may indicate information about bits received through the I3C bus I3C-BUS. The master device 310 may determine whether the external interrupt signal EINT is included in the received data, based on the masking information.

When the external interrupt signal EINT is included in the received data, in operation S370 the master device 310 may wake up. For example, the VGI FSM 313 may provide the external interrupt signal EINT to the power management unit PMU. In response to the external interrupt signal EINT, the power management unit PMU may provide necessary power to the components of the master device 310 or may control the clock management unit CMU. The clock management unit CMU may provide the main clock CLm to each component of the master device 310 under control of the power management unit PMU.

As described above, according to an embodiment of the disclosure, a hardware function block included in a master device may communicate with any other hardware function blocks of a slave device by using GPIO-based hardware signals. In this case, the master device may virtualize the GPIO-based hardware signals to generate a virtual GPIO payload and may provide the virtual GPIO payload to the slave device through an I3C bus. Accordingly, the number of physical signal lines for implementing the GPIO communication may decrease.

Also, according to an embodiment of the disclosure, the master device may perform the I3C communication according to a control of a main CPU; and the master device may perform the virtual GPIO communication performed without a direct intervention of the main CPU or separate software. In this case, the master device may arbitrate the I3C communication and the virtual GPIO communication based on an I3C queue and a virtual GPIO queue, thus preventing communication starvation due to the I3C communication according to a control of the main CPU.

Also, according to an embodiment of the disclosure, in the case where the master device is in the sleep mode, communication may be performed through the I3C bus by waking up only some components of the master device through a detection operation of the serial data line detection unit SDA-DU, and thus, communication with the slave device may be performed in a state where the sleep mode of the master device is maintained.

The embodiments of the disclosure above described are simple examples to describe the technical feature of disclosure easily, and the disclosure is not limited thereto. The technical feature of the disclosure may be implemented by each of the above-described embodiments or a combination thereof.

Figure 12:
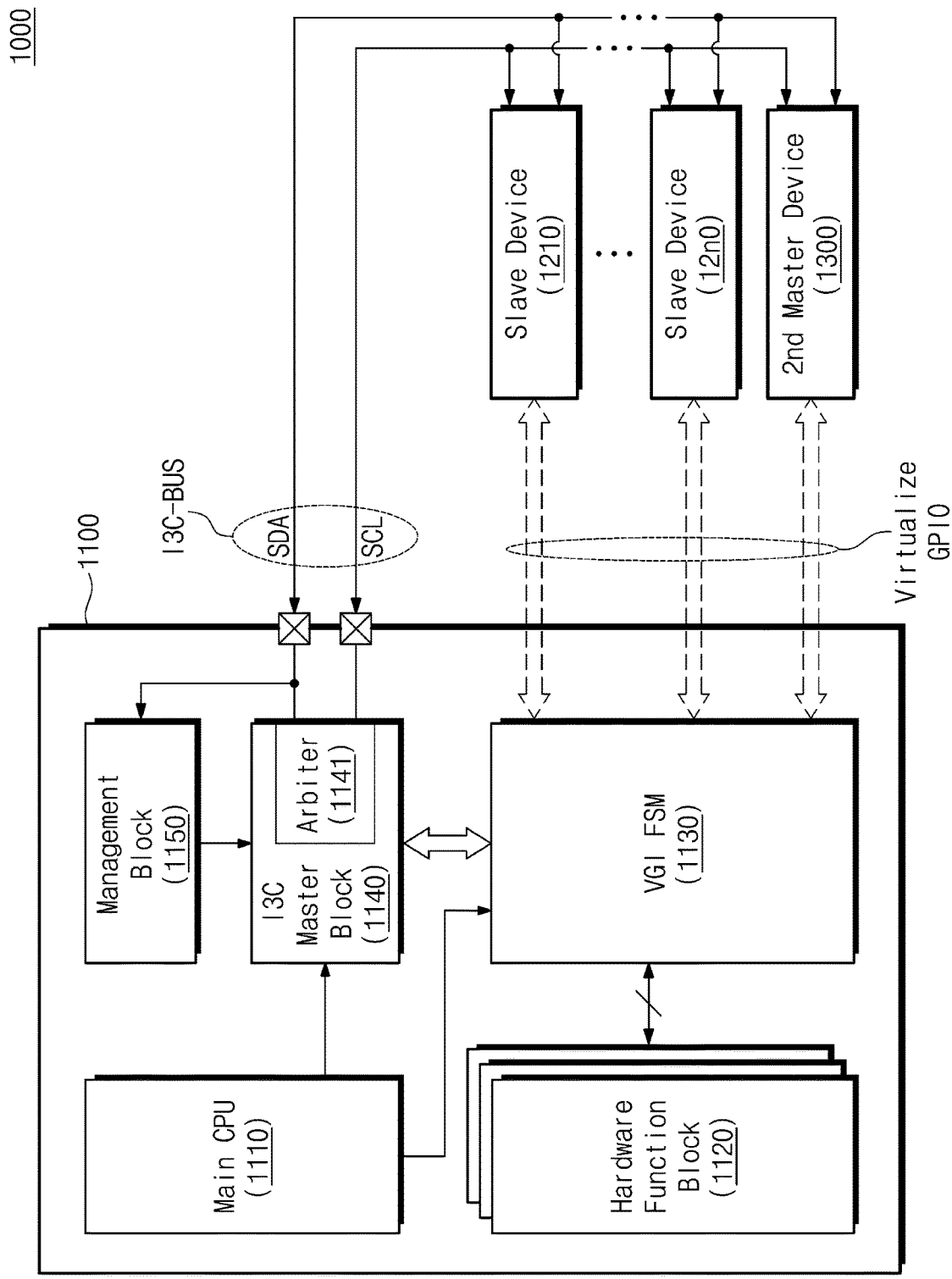
FIG. 12 is a block diagram illustrating an electronic device to which a technical feature according to an embodiment of the disclosure is applied.

FIG. 12 is a block diagram illustrating an electronic device to which a technical feature according to an embodiment of the disclosure is applied. Referring to FIG. 12, an electronic device 1000 may include a host device 1100, a plurality of slave devices 1210 to 12n0, and a secondary master device 1300.

The host device 1100 may include a main CPU 1110, a hardware function block 1120, a VGI FSM 1130, an I3C master block 1140 having an arbiter 1141, and a management block 1150. In an example embodiment, the host device 1100 may be any one of the master devices 110, 210, and 310 described above or a combination thereof and operations of components included in the host device 1100 may be similar to the operations of the above-described components. Thus, additional description of respective components will be omitted to avoid redundancy.

The host device 1100 may communicate with the plurality of slave devices 1210 to 12n0 through the I3C bus I3C-BUS. For example, the plurality of slave devices 1210 to 12n0 may be distinguished by predefined addresses. The host device 1100 may transmit an address, which corresponds to a target slave device (e.g., a slave device targeted for communication) among the plurality of slave devices 1210 to 12n0, through the I3C bus I3C-BUS. In response to the address provided through the I3C bus I3C-BUS, the target slave device may communicate with the host device 1100 through the I3C bus I3C-BUS.

In an example embodiment, the address corresponding to the target slave device may be included in a virtual GPIO payload. In an example embodiment, to support a communication method according to an embodiment of the disclosure, each of the slave devices 1210 to 12n0 may include an I3C slave device (capable of including an arbiter), a VGI FSM, and a management block described with reference to FIGS. 1 to 11.

In an example embodiment, the secondary master device 1300 may operate as slave device with regard to the host device 1100 and may operate as a master device with regard to the plurality of slave devices 1210 to 12n0.

As described above, the host device 1100 according to an embodiment of the disclosure may virtualize GPIO-based hardware signals to generate a virtual GPIO payload and may provide the generated virtual GPIO payload to the target slave device through the I3C bus I3C-BUS. Accordingly, because the GPIO between the host device 1100 and the devices 1210 to 12n0 and 1300 is virtualized, the number of physical signal lines may decrease.

Figure 13A:
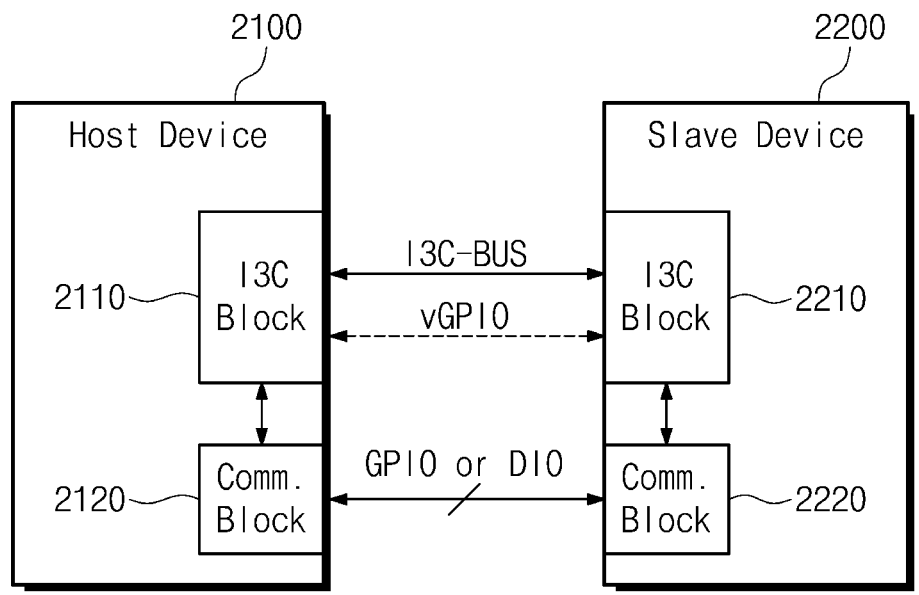
FIGS. 13A and 13B are block diagrams illustrating an electronic device according to an embodiment of the disclosure.
Figure 13B:
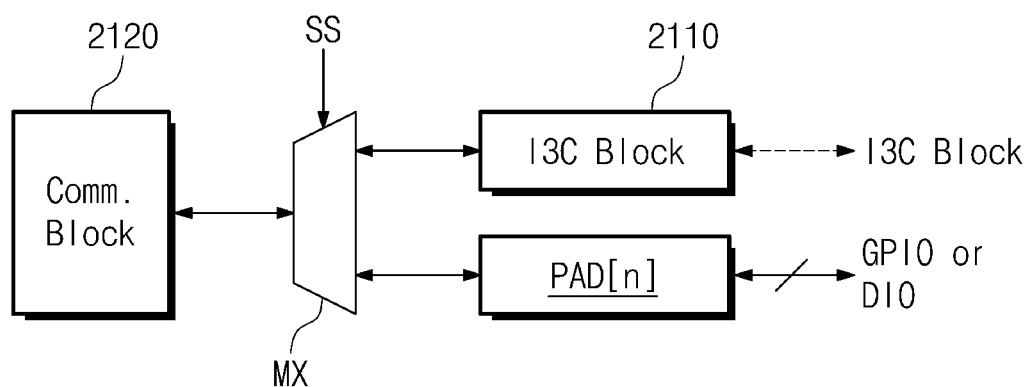

FIGS. 13A and 13B are block diagrams illustrating an electronic device according to an embodiment of the disclosure. Referring to FIGS. 13A and 13B, an electronic device 2000 may include a host device 2100 and slave device 2200. The host device 2100 may include an I3C block 2110 and a communication block 2120, and the slave device 2200 may include an I3C block 2210 and a communication block 2220. In an example embodiment, the host device 2100 and the slave device 2200 may be configured to perform the I3C communication or the virtual GPIO vGPIO communication described with reference to FIGS. 1 to 12.

In an example embodiment, the host device 2100 and the slave device 2200 may be configured to perform communication (hereinafter referred to as to "GPIO communication") that is based on GPIO or dedicated I0 (DIO). For example, hardware function blocks included in the host device 2100 may perform the GPIO communication by using the I3C block 2110 and may perform the GPIO communication by using the communication block 2120.

That is, the hardware function blocks included in the host device 2100 may be configured to perform virtual GPIO on a part of the GPIO and to perform normal GPIO communication on the rest of the GPIO. Alternatively, depending on a way to implement the host device 2100, signal pads PAD[n] formed for the GPIO may be used to exchange a separate signal with a slave device.

For example, as illustrated in FIG. 13B, a multiplexer MX may be connected with the communication block 2120, the I3C block 2110, and the signal pads PAD[n] and may be configured to select each signal path in response to a select signal SS. In an example embodiment, even though a term of "the multiplexer MX" is used in this specification, the multiplexer MX may be operated as a demultiplexer.

For example, in response to the select signal SS, the multiplexer MX may provide virtual GPIO communication-based signals received through the I3C block 2110 to the communication block 2120. Alternatively, in response to the select signal SS, the multiplexer MX may provide virtual GPIO communication-based signals received through the communication block 2120 to the I3C block 2110. In this case, as described with reference to FIGS. 1 to 12, the host device 2100 may perform the virtual GPIO communication.

Alternatively, in response to the select signal SS, the multiplexer MX may provide a signal received through the signal pads PAD[n] to the communication block 2120. Alternatively, in response to the select signal SS, the multiplexer MX may provide signals received through the communication block 2120 to the signal pads PAD[n]. In this case, the host device 2100 may perform the GPIO communication described with reference to FIG. 1B.

For convenience, a description is given as the host device 2100 performs the virtual GPIO communication and the GPIO communication individually, but the disclosure is not limited thereto. For example, by setting the select signal SS, the host device 1100 may perform the virtual GPIO communication, the GPIO communication, or a combination thereof. In an example embodiment, the select signal SS may be determined by an I/O selecting value set to the VGI register vgi-SFR (refer to FIG. 2) and OTP data set in advance.

As described above, the host device 2100 may be configured to perform the virtual GPIO communication by using the I3C block 2110 and to perform separate communication through the signal pads PAD[n] (corresponding to signal pads for the GPIO communication). Accordingly, the extendability of an electronic device may be improved.

Figure 14:
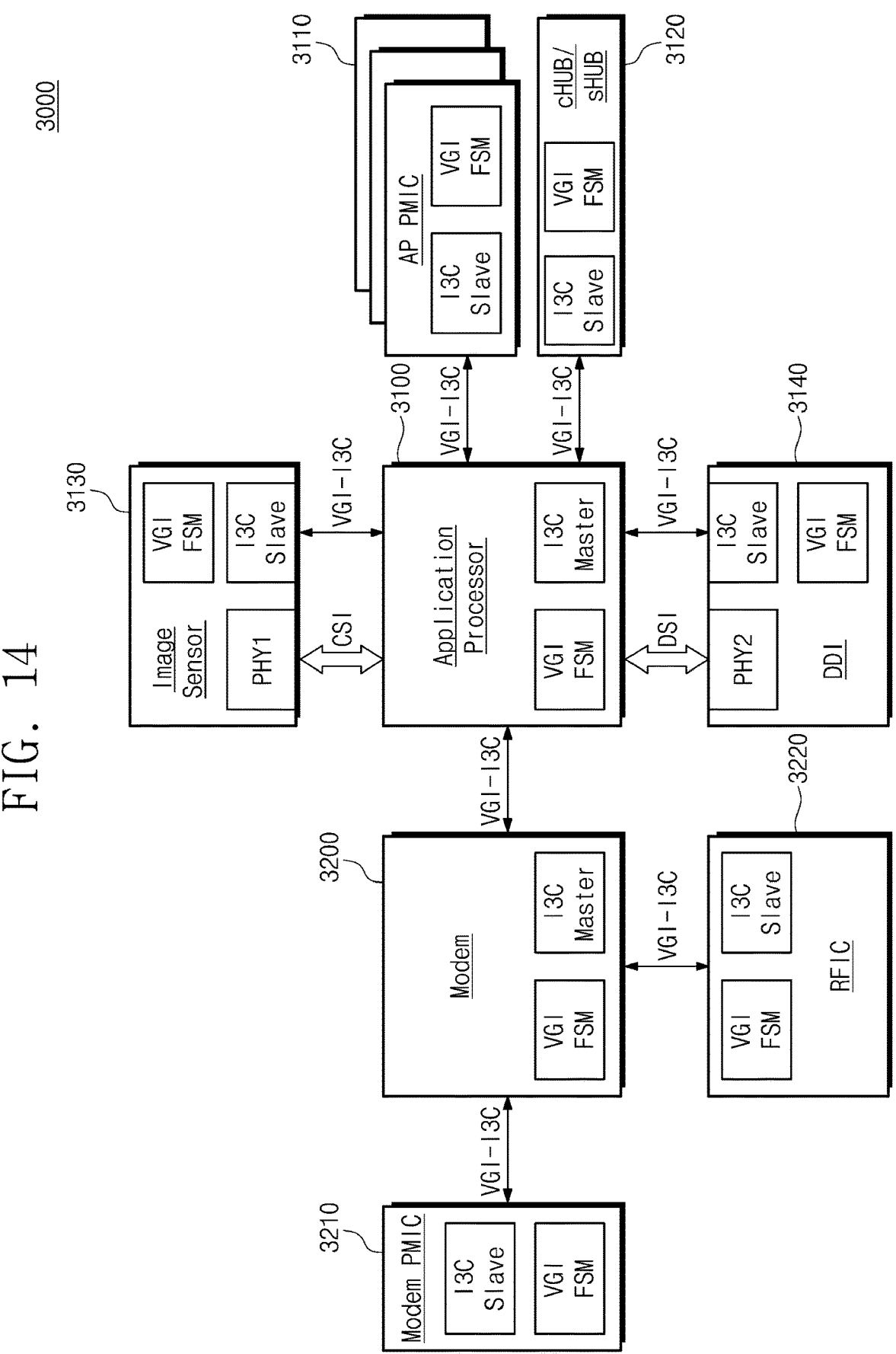
FIG. 14 is a block diagram illustrating an electronic device to which a technical feature according to an embodiment of the disclosure is applied.

FIG. 14 is a block diagram illustrating an electronic device to which a technical feature according to an embodiment of the disclosure is applied. Referring to FIG. 14, an electronic device 3000 may include an application processor 3100 and a modem 3200. In an example embodiment, the electronic device 3000 may be a portable computing system such as a smartphone, a tablet PC, or a laptop, a vehicle electronic system such as an electric vehicle or an autonomous vehicle, or a part thereof.

The application processor 3100 may be configured to drive various software on the electronic device 3000 or to control various hardware included inside or outside the electronic device 3000.

In an example embodiment, the application processor 3100 may communicate with various devices based on an operation method according to an embodiment of the disclosure. For example, the application processor 3100 may perform the I3C bus-based virtual GPIO communication method (hereinafter referred to as "I3C-based VGI communication") described with reference to FIGS. 1 to 11.

The application processor 3100 may be configured to perform the I3C-based VGI communication VGI-I3C with a plurality of application processor (AP) power management integrated circuits (PMICs) 3110. The application processor 3100 may be configured to perform the I3C-based VGI communication VGI-I3C with a cHUB/sHUB 3120 (context HUB or sensor HUB). The application processor 3100 may be configured to perform the I3C-based VGI communication VGI-I3C with an image sensor 3130. In an example embodiment, the application processor 3100 may exchange a large amount of image data with the image sensor 3130 through a camera serial interface (CSI). A CMOS image sensor 3130 may separately include a first physical layer PHY1 for the CSI.

The application processor 3100 may be configured to perform the I3C-based VGI communication VGI-I3C with a display driver integrated circuit (DDI) 3140. In an example embodiment, the application processor 3100 may exchange a large amount of display data with the display driver integrated circuit 3140 through a display serial interface (DSI). The display driver integrated circuit 3140 may separately include a second physical layer PHY2 for the DSI. In an example embodiment, the first and second physical layers PHY1 and PHY2 may be implemented in compliance with a D-PHY protocol defined by the MIPI alliance.

In an example embodiment, to implement the I3C-based VGI communication VGI-I3C described above, the application processor 3100 may include an I3C master block and a VGI FSM described with reference to FIGS. 1 to 11 and each of the plurality of AP power management integrated circuits 3110, the cHUB/sHUB 3120, the image sensor 3130, and the display driver integrated circuit 3140 may include an I3C slave block and a VGI FSM described with reference to FIGS. 1 to 11. Although not illustrated in drawings, each of the application processor 3100, the plurality of AP power management integrated circuits 3110, the cHUB/sHUB 3120, the image sensor 3130, and the display driver integrated circuit 3140 may further include an arbiter or a management block described with reference to FIGS. 1 to 11.

The modem 3200 may be configured to perform wireless or wired communication with the outside. In an example embodiment, the modem 3200 may communicate with various components based on the I3C-based VGI communication VGI-I3C. For example, the modem 3200 may perform the I3C-based VGI communication VGI-I3C with a modem power management integrated circuit 3210 and may perform the I3C-based VGI communication VGI-I3C with an RF integrated circuit 3220.

In an example embodiment, to implement the I3C-based VGI communication VGI-I3C described above, the modem 3200 may include an I3C master block and a VGI FSM described with reference to FIGS. 1 to 11 and each of the modem power management integrated circuit 3210 and the RF integrated circuit RFIC 3220 may include an I3C slave block and a VGI FSM described with reference to FIGS. 1 to 11. Although not illustrated in drawings, each of the modem 3200, the modem power management integrated circuit 3210, and the RF integrated circuit 3220 may further include an arbiter or a management block described with reference to FIGS. 1 to 11.

In an example embodiment, the application processor 3100 and the modem 3200 may mutually perform the I3C-based VGI communication VGI-I3C. To implement the I3C-based VGI communication VGI-I3C between the application processor 3100 and the modem 3200, the I3C master block of the modem 3200 may be implemented with a secondary I3C master block.

Figure 15:
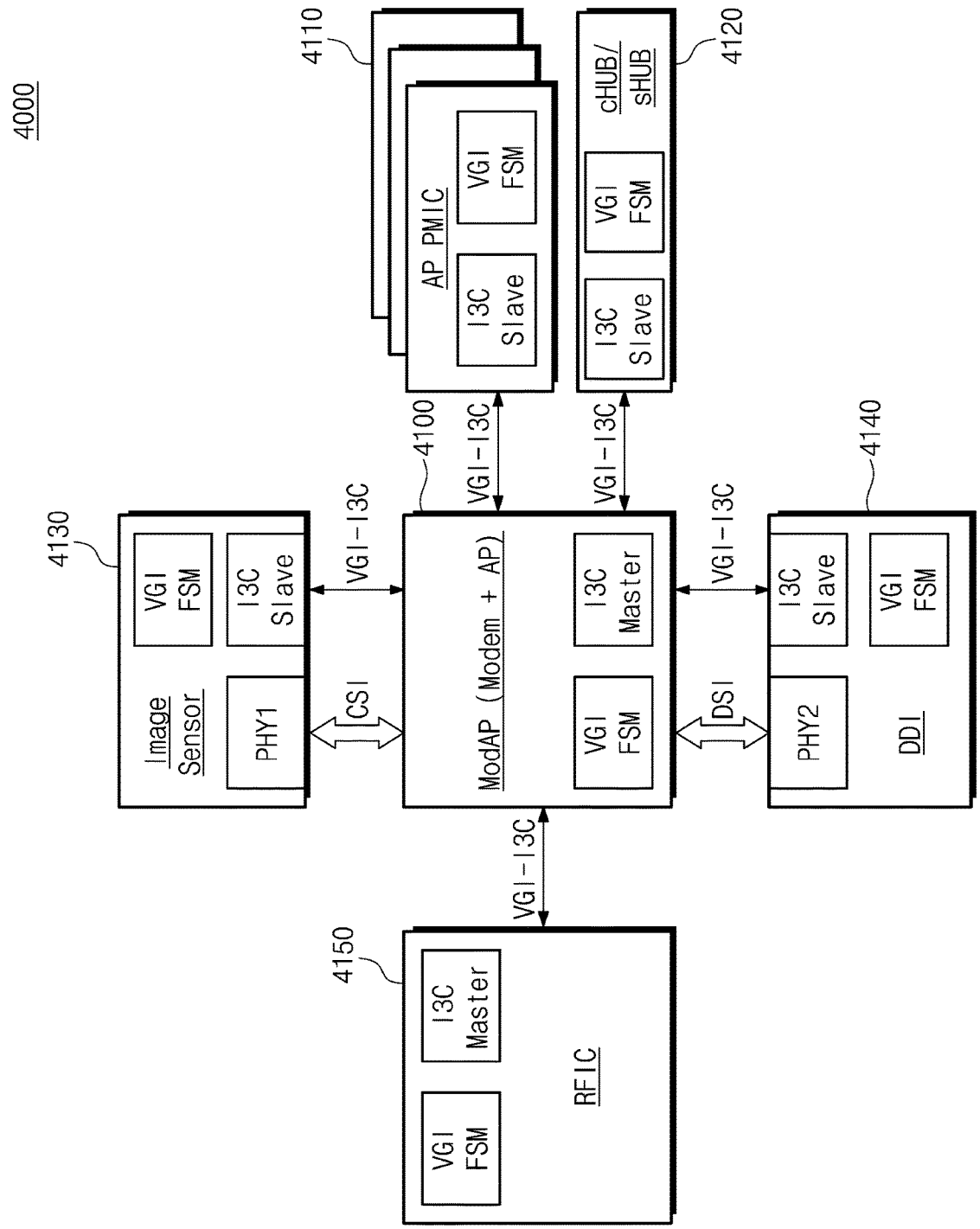
FIG. 15 is a block diagram illustrating an electronic device to which a technical feature according to an embodiment of the disclosure is applied.

FIG. 15 is a block diagram illustrating an electronic device to which a technical feature according to an embodiment of the disclosure is applied. Referring to FIG. 15, an electronic device 4000 may include a ModAP 4100, a plurality of PMICs 4110, a cHUB/sHUB 4120, an image sensor 4130, a display driver integrated circuit 4140, and an RF integrated circuit 4150.

The ModAP 4100 may be a device in which the application processor 3100 and the modem 3200 of FIG. 14 are integrated. That is, the ModAP 4100 may be configured to drive various application on the electronic device 4000, to control various hardware, and to perform wireless/wired communication with the outside of the electronic device 4000.

As in the description given with reference to FIG. 14, the ModAP 4100 may be configured to perform I3C-based VGI communication VGI-I3C with each of the plurality of PMICs 4110, the cHUB/sHUB 4120, the image sensor 4130, the display driver integrated circuit 4140, and the RF integrated circuit 4150. To this end, the ModAP 4100 may include an I3C master block and a VGI FSM described with reference to FIGS. 1 to 14 and each of the plurality of PMICs 4110, the cHUB/sHUB 4120, the image sensor 4130, the display driver integrated circuit 4140, and the RF integrated circuit 4150 may include an I3C slave block and a VGI FSM described with reference to FIGS. 1 to 14. In an example embodiment, each of the ModAP 4100, the plurality of PMICs 4110, the cHUB/sHUB 4120, the image sensor 4130, the display driver integrated circuit 4140, and the RF integrated circuit 4150 may further include an arbiter or a management block described with reference to FIGS. 1 to 14.

As in the above description, the image sensor 4130 may further include the first physical layer PHY1 for the CSI and the display driver integrated circuit 4140 may further include the second physical layer PHY2 for the DSI.

According to an embodiment of the disclosure, the number of physical signal lines necessary to support a GPIO (General Purpose Input/Output) may decrease by virtualizing GPIO-based hardware signals to communicate with an external device through a serial interface (e.g., I3C). Accordingly, a semiconductor integrated circuit having reduced costs and improved performance and an operation method thereof are provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been described with reference to example embodiments thereof, it will be apparent to those of ordinary skill in the art that various changes and modifications may be made thereto without departing from the spirit and scope of the disclosure as set forth in the following claims.

What is claimed is:

1. A semiconductor integrated circuit comprising:
a central processing unit;
a hardware function block configured to output a plurality of hardware signals to be transmitted to an external device independently of the central processing unit;
a virtual general purpose input/output (GPIO) finite state machine configured to transform the plurality of hardware signals to a virtual GPIO payload;
an I3C communication block configured to transmit the virtual GPIO payload to the external device through a serial data line and a serial clock line; and
a management block configured to:
in a normal mode of the semiconductor integrated circuit, provide a main clock to the hardware function block, the virtual GPIO finite state machine, and the I3C communication block, and
in a sleep mode of the semiconductor integrated circuit, block the main clock and provide a first clock to the virtual GPIO finite state machine and the I3C communication block, such that the sleep mode of the semiconductor integrated circuit is maintained, in response to a level of the serial data line, wherein:
the I3C communication block includes an arbiter configured to arbitrate a first communication that is performed through the serial data line and the serial clock line under control of the central processing unit and a second communication that is performed without intervention of the central processing unit,
the first communication is an I3C communication that is performed by the central processing unit and the second communication is an I3C-based virtual GPIO communication for the virtual GPIO payload,
the virtual GPIO finite state machine and the I3C communication block wake up in response to the first clock,
the I3C communication block that wakes up is further configured to receive data from the external device through the serial data line and the serial clock line, based on an in-band-interrupt manner, and
the management block is further configured to provide the main clock to the central processing unit and the hardware function block such that the semiconductor integrated circuit wakes-up in response to an external interrupt signal in the received data.

2. The semiconductor integrated circuit of claim 1, wherein the I3C communication block transmits the virtual GPIO payload to the external device without intervention of the central processing unit.

3. The semiconductor integrated circuit of claim 1, wherein the virtual GPIO payload includes address information corresponding to the external device.

4. The semiconductor integrated circuit of claim 1, wherein the management block includes:
a clock management unit configured to output the main clock in the normal mode and to output a second clock, which is generated by dividing the first clock by n (n being a positive integer), in a sleep mode;
a serial data line detection unit configured to operate based on the second clock and to output a clock enable signal when the serial data line is pulled down to a low level; and
a power management unit configured to control the clock management unit in response to the clock enable signal such that the first clock is provided to the virtual GPIO finite state machine and the I3C communication block.

5. The semiconductor integrated circuit of claim 4, wherein:
when the data received from the external device include the external interrupt signal, the virtual GPIO finite state machine is further configured to transfer the external interrupt signal to the power management unit, and
the power management unit is further configured to control the clock management unit in response to the external interrupt signal such that the main clock is provided to the central processing unit and the hardware function block.

6. The semiconductor integrated circuit of claim 1, wherein:
the I3C communication block further includes:
an I3C queue including information about at least one first operation corresponding to the first communication; and
a virtual GPIO queue including information about at least one second operation corresponding to the second communication, and
the arbiter sequentially performs the at least one first operation and the at least one second operation, through the serial data line and the serial clock line, based on a priority of the at least one first operation included in the I3C queue and the at least one second operation included in the virtual GPIO queue.

7. The semiconductor integrated circuit of claim 1, wherein the virtual GPIO finite state machine includes:

a virtual GPIO specific function register configured to set masking information by the central processing unit;
a receiving unit configured to receive the plurality of hardware signals from the hardware function block and the masking information from the virtual GPIO specific function register; and
virtual GPIO sync logic configured to generate the virtual GPIO payload based on the plurality of hardware signals and the masking information received by the receiving unit.

8. The semiconductor integrated circuit of claim 7, wherein:
the virtual GPIO sync logic detects a change in at least one signal of the plurality of hardware signals at a predefined interval, and
when the change in the at least one signal is detected by the virtual GPIO sync logic, the virtual GPIO sync logic generates the virtual GPIO payload based on the change in the at least one signal.

9. The semiconductor integrated circuit of claim 1, wherein the semiconductor integrated circuit is any one of an application processor, a modem, and an integrated modem and application processor (ModAP).

10. A semiconductor integrated circuit comprising:
a central processing unit;
a hardware function block configured to output a plurality of first hardware signals based on a general purpose input/output (GPIO) independently of the central processing unit;
a virtual GPIO finite state machine configured to generate a first virtual GPIO payload based on masking information set by the central processing unit and the plurality of first hardware signals;
an I3C communication block configured to transmit the first virtual GPIO payload to an external device through a serial data line and a serial clock line; and
a management block configured to provide a main clock or a first clock to the central processing unit, the hardware function block, the virtual GPIO finite state machine, and the I3C communication block, wherein:
in a sleep mode of the semiconductor integrated circuit, the management block blocks the main clock and provides the first clock to the I3C communication block and the virtual GPIO finite state machine in response to a pulled-down low level of the serial data line,
in the sleep mode of the semiconductor integrated circuit, the I3C communication block and the virtual GPIO finite state machine wake up in response to the first clock and the semiconductor integrated circuit is maintained in the sleep mode,
the I3C communication block that wakes up receives a second virtual GPIO payload from the external device through the serial data line and the serial clock line, based on an in-band-interrupt manner,
the virtual GPIO finite state machine that wakes up transforms the second virtual GPIO payload to a plurality of second hardware signals,
the I3C communication block includes an arbiter configured to arbitrate a first communication that is performed through the serial data line and the serial clock line under control of the central processing unit and a second communication that is performed without intervention of the central processing unit,
the first communication is an I3C communication that is performed by the central processing unit and the second communication is an I3C-based virtual GPIO communication for the first virtual GPIO payload,
in the sleep mode, when an external interrupt signal is included in the plurality of second hardware signals, the virtual GPIO finite state machine is further configured to transfer the external interrupt signal to the management block, and
in response to the external interrupt signal, the management block is further configured to release the blocking of the main clock such that the main clock is provided to the central processing unit, the hardware function block, the virtual GPIO finite state machine, and the I3C communication block.

11. The semiconductor integrated circuit of claim 10, wherein the external interrupt signal is determined by any one of the plurality of second hardware signals based on the masking information.

12. The semiconductor integrated circuit of claim 10, wherein:
the I3C communication block includes:
an I3C queue including information about at least one first operation corresponding to the first communication; and
a virtual GPIO queue including information about at least one second operation corresponding to the second communication, and
the arbiter sequentially performs the at least one first operation and the at least one second operation, through the serial data line and the serial clock line, based on a priority of the at least one first operation included in the I3C queue and the at least one second operation included in the virtual GPIO queue.

13. An operation method of a semiconductor integrated circuit which is configured to communicate with an external device through an I3C bus including a serial data line and a serial clock line, the method comprising:
generating, by a hardware function block, a plurality of hardware signals based on a general purpose input/output (GPIO);
generating, by a virtual general purpose input/output (GPIO) finite state machine, a first virtual GPIO payload based on masking information set by a central processing unit and the plurality of hardware signals;
transmitting, by an I3C communication block, the first virtual GPIO payload to an external device through the serial data line and the serial clock line, without intervention of the central processing unit;
arbitrating, by an arbiter of the I3C communication block, a first communication that is performed through the serial data line and the serial clock line under control of the central processing unit and a second communication that is performed without intervention of the central processing unit;
providing, by a management block, in a normal mode of the semiconductor integrated circuit, a main clock to the hardware function block, the virtual GPIO finite state machine, and the I3C communication block; and
in a sleep mode of the semiconductor integrated circuit, blocking, by the management block, the main clock and providing a first clock to the virtual GPIO finite state machine and the I3C communication block in response to a level of the serial data line, receiving a second virtual GPIO payload from the external device based on an in-band-interrupt manner by using the first clock, when the level of the serial data line is pulled down to a low level, and waking up the semiconductor integrated circuit when an external interrupt signal is included in the second virtual GPIO payload, wherein the first communication is an I3C communication that is performed by the central processing unit and the second communication is an I3C-based virtual GPIO communication for the first virtual GPIO payload.

* * * * *